(12) United States Patent
Yoda et al.

(10) Patent No.: US 12,115,804 B2
(45) Date of Patent: Oct. 15, 2024

(54) METHOD FOR FORMING PRINT, THERMAL TRANSFER SHEET, AND COMBINATION OF THERMAL TRANSFER SHEET AND INTERMEDIATE TRANSFER MEDIUM

(71) Applicant: Dai Nippon Printing Co., Ltd., Tokyo (JP)

(72) Inventors: Shinya Yoda, Tokyo (JP); Yasushi Yoneyama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 441 days.

(21) Appl. No.: 17/387,062

(22) Filed: Jul. 28, 2021

(65) Prior Publication Data

US 2021/0354424 A1 Nov. 18, 2021

Related U.S. Application Data

(62) Division of application No. 16/085,715, filed as application No. PCT/JP2017/010731 on Mar. 16, 2017, now Pat. No. 11,186,064.

(30) Foreign Application Priority Data

Mar. 18, 2016 (JP) ................................ 2016-055707

(51) Int. Cl.
*B41M 5/382* (2006.01)
*B41M 3/06* (2006.01)
*B41M 5/52* (2006.01)

(52) U.S. Cl.
CPC .......... *B41M 5/38257* (2013.01); *B41M 3/06* (2013.01); *B41M 5/38228* (2013.01);
(Continued)

(58) Field of Classification Search
CPC ............................. B41M 3/06; B41M 5/38228; B41M 5/38257; B41M 5/38264; B41M 5/52;
(Continued)

(56) References Cited

U.S. PATENT DOCUMENTS 4,891,352 A * 1/1990 Byers .................... B41M 5/385
503/227
2004/0241353 A1 12/2004 Odamura et al.
(Continued)

FOREIGN PATENT DOCUMENTS

JP 55-22975 2/1980
JP S58-148778 A1 9/1983
(Continued)

OTHER PUBLICATIONS

International Search Report and Written Opinion (Application No. PCT/JP2017/010731) dated May 9, 2021.
(Continued)

*Primary Examiner* — Gerard Higgins
(74) *Attorney, Agent, or Firm* — BURR PATENT LAW, PLLC

(57) ABSTRACT

An intermediate transfer medium having a first transfer layer releasably provided on a support, a thermal transfer sheet in which a first colorant layer, a second transfer layer, and a second colorant layer are provided on one surface of a substrate so as being frame sequentially, and the second transfer layer is releasably provided from the substrate, and a transfer receiving article. The first colorant layer is used to form a first image on the first transfer layer of the intermediate transfer medium. The second transfer layer is transferred onto the first transfer layer on which the first image is formed, and then, the second colorant layer is used to form a second image on the second transfer layer. The first transfer layer is transferred together with the second transfer layer transferred on the first transfer layer onto the transfer receiving article to obtain a print having a stereoscopic image.

1 Claim, 6 Drawing Sheets

(52) U.S. Cl.
CPC .......... *B41M 5/38264* (2013.01); *B41M 5/52* (2013.01); *B41M 5/5236* (2013.01); *B41M 2205/10* (2013.01); *B41M 2205/30* (2013.01); *Y10T 428/24802* (2015.01)

(58) Field of Classification Search
CPC ............ B41M 5/5236; B41M 2205/10; B41M 2205/30
See application file for complete search history.

(56) References Cited

U.S. PATENT DOCUMENTS

| | | |
|---|---|---|
| 2008/0079799 A1 | 4/2008 | Ihara et al. |
| 2019/0092040 A1 | 3/2019 | Yoda |

FOREIGN PATENT DOCUMENTS

| | | | | |
|---|---|---|---|---|
| JP | 59054598 A | * | 3/1984 | ........ B41M 5/38207 |
| JP | 62-238791 | | 10/1987 | |
| JP | H06-122281 A1 | | 5/1994 | |
| JP | 10-151871 | | 6/1998 | |
| JP | H11-198576 | | 7/1999 | |
| JP | 2004-195941 A1 | | 7/2004 | |
| JP | 2007-331180 A1 | | 12/2007 | |
| JP | 2008-080682 A1 | | 4/2008 | |
| JP | 2017-065193 A1 | | 4/2017 | |

OTHER PUBLICATIONS

Partial European Search Report (Application No. 17766801.9) dated Mar. 11, 2019.
Supplementary European Search Report from a corresponding European patent application (EP 17766801.9) dated Jul. 22, 2019.
Korean Office Action (Application No. 10-2018-7028865) dated May 18, 2021 (with English translation).

* cited by examiner

METHOD FOR FORMING PRINT, THERMAL TRANSFER SHEET, AND COMBINATION OF THERMAL TRANSFER SHEET AND INTERMEDIATE TRANSFER MEDIUM

CROSS REFERENCE TO RELATED APPLICATIONS

This application is a division of U.S. application Ser. No. 16/085,715, filed Sep. 17, 2018, which in turn is a National Stage entry of International Application No. PCT/JP2017/010731, filed Mar. 16, 2017, which is designated in the U.S., the entireties of which are incorporated herein by reference.

TECHNICAL FIELD

The present invention relates to a method for forming a print, a thermal transfer sheet, and a combination of a thermal transfer sheet and an intermediate transfer medium.

BACKGROUND ART

As a medium for forming a print without restriction due to transfer receiving articles, an intermediate transfer medium in which a transfer layer including a protective layer and a receiving layer are layered on a substrate in this order from the side of the substrate has been used (for example, Patent Literature 1). According to this intermediate transfer medium, a print where a thermally transferable image has been formed on a transfer receiving article can be obtained by forming the thermally transferable image on a receiving layer located on the outermost surface of the intermediate transfer medium by means of a thermal transfer sheet having colorant layers, and then transferring the transfer layer including the receiving layer on which the thermally transferable image has been formed onto the optional transfer receiving article.

Recently, there has been a demand for forming prints having a thermally transferable image having a depth in the direction of the thickness, in other words, prints having a stereoscopic image by using the intermediate transfer medium. In formation of a print having a stereoscopic image, however, intermediate transfer media as many as the number of images constituting the stereoscopic image is necessary, and thus, the forming step may become complicated, which is problematic. For example, for forming a print in which a first image and a second image for constituting a stereoscopic image are located so as to be superposed in the thickness direction, a first intermediate transfer medium for forming the first image and a second intermediate transfer medium for forming the second image are provided. A formation step involves transferring a transfer layer including a receiving layer on which the first image is formed and transferring a transfer layer including a receiving layer on which the second image is formed. In this example, a first image is formed on the receiving layer located on the outermost surface of the first intermediate transfer medium, and then, a transfer layer including the receiving layer on which the first image is formed is transferred onto any transfer receiving article. Subsequently, a second image is formed on the receiving layer located on the outermost surface of the second intermediate transfer medium, and then, a transfer layer including the receiving layer on which the second image is formed is transferred onto the transfer layer that has been transferred on a transfer receiving article and includes the receiving layer on which the first image is formed. Thus, a print in which the first image and the second image are located so as to be superposed in the thickness direction can be obtained.

In the example described above, one intermediate transfer medium is used to form a first image on the receiving layer located on the outermost surface of the intermediate transfer medium, a second image is formed on this first image so as to be in a direct contact with the first image, the transfer layer including the receiving layer on which the first image and the second image are formed is transferred directly onto a transfer receiving article, and thus, a print in which the first image and the second image are superposed in the thickness direction can be obtained. In accordance with this method, although a print in which the first image and the second image are superposed in the thickness direction can be obtained without use of a plurality of intermediate transfer medium, bleeding may occur in the images depending on the colorant components and the like contained in each of the images because the first image is in a direct contact with the second image. In a case where the first image is in a direct contact with the second image, a problem in that it is not possible to impart a sufficient depth feeling for the image would occur. There is also a demand for obtaining a print including a plurality of thermally transferable images and having high designability instead of a print including a thermally transferable images having a depth in the thickness direction.

CITATION LIST

Patent Literature

Patent Literature 1: Japanese Patent Laid-Open No. 62-238791

SUMMARY OF INVENTION

Technical Problem

The present invention has been made in view of the above-mentioned circumstances, and aims principally to provide a method for easily forming a print having a stereoscopic image or a print having high designability, a thermal transfer sheet used for forming such a print, and a combination of a thermal transfer sheet and an intermediate transfer medium.

Solution to Problem

The method for forming a print according to an embodiment of the present disclosure for solving the above-mentioned problem is characterized by including a step of providing an intermediate transfer medium in which a first transfer layer is releasably provided on a support, a step of providing a thermal transfer sheet in which a first colorant layer, a second transfer layer, and a second colorant layer are provided on one surface of a substrate so as being frame sequentially and the second transfer layer is provided releasably from the substrate, a step of providing a transfer receiving article, a first image formation step of combining the intermediate transfer medium with the thermal transfer sheet to form a first image onto the first transfer layer of the intermediate transfer medium using the first colorant layer of the thermal transfer sheet, a first transfer step of transferring the second transfer layer of the thermal transfer sheet onto the first transfer layer on which the first image is formed, a second image formation step of forming a second image on the second transfer layer using the second colorant layer of the thermal transfer sheet, and a second transfer step of transferring the first transfer layer of the intermediate transfer medium together with the second transfer layer transferred on the first transfer layer onto the transfer receiving article.

The method for forming a print according to an embodiment of the present disclosure for solving the above-mentioned problem is also characterized in that the method includes a step of providing an intermediate transfer medium in which a first transfer layer is provided on a support, a step of providing a thermal transfer sheet, and a step of providing a transfer receiving article, the thermal transfer sheet has a first colorant layer, a second colorant layer, and a second transfer layer, and is any of (i) a combination of a thermal transfer sheet in which the first colorant layer is provided on a substrate, a thermal transfer sheet in which the second colorant layer is provided on a substrate, and a thermal transfer sheet in which the second transfer layer is provided on a substrate, (ii) a combination of a thermal transfer sheet in which any one layer of the first colorant layer, the second colorant layer, and the second transfer layer is provided on a substrate and a thermal transfer sheet in which the other two layers are provided on a substrate so as being frame sequentially, and (iii) a thermal transfer sheet in which the first colorant layer, the second colorant layer, and the second transfer layer are provided on a substrate so as being frame sequentially, and the method includes a first image formation step of combining the intermediate transfer medium with the thermal transfer sheet to form a first image onto the first transfer layer of the intermediate transfer medium using the first colorant layer of the thermal transfer sheet, a first transfer step of transferring the second transfer layer onto the first transfer layer on which the first image is formed, a second image formation step of forming a second image on the second transfer layer using the second colorant layer of the thermal transfer sheet, and a second transfer step of transferring the first transfer layer of the intermediate transfer medium together with the second transfer layer transferred on the first transfer layer onto the transfer receiving article.

The first transfer layer and the second transfer layer each may have a single-layer structure or layered structure including a receiving layer, the first colorant layer and the second colorant layer each may be a colorant layer containing a sublimable dye or fluorescent dye, the first image formation step may be a step of forming the first image by transferring the dye contained in the first colorant layer onto the receiving layer of the first transfer layer, and the second image formation step may be a step of forming the second image by transferring the dye contained in the second colorant layer onto the receiving layer of the second transfer layer.

The second transfer layer also may have a layered structure in which a receiving layer and a masking layer are layered in this order from the side of the substrate.

The receiving layer included in the second transfer layer may contain a cellulose-based resin, and the cellulose-based resin may be either one or both of a cellulose acetate butyrate resin and a cellulose acetate propionate resin.

The first transfer layer may have a single-layer structure or layered structure including a receiving layer, the second transfer layer may be a heat-seal panel, the first colorant layer may be a colorant layer containing a sublimable dye or fluorescent dye, the second colorant layer may be a thermally fusible ink layer, the first image formation step may be a step of forming the first image by transferring the dye contained in the first colorant layer onto the receiving layer of the first transfer layer, and the second image formation step may be a step of forming the second image by melt-transferring the second colorant layer onto the second transfer layer.

The method for forming a print according to an embodiment of the present disclosure for solving the above-mentioned problem is characterized by including a step of providing an intermediate transfer medium in which a first transfer layer is releasably provided on a support, a step of providing a thermal transfer sheet in which a first colorant layer, a second transfer layer including a masking layer, and a second colorant layer are provided on one surface of a substrate so as being frame sequentially and the second transfer layer is provided releasably from the substrate, a step of providing a transfer receiving article, a first image formation step of combining the intermediate transfer medium with the thermal transfer sheet to form a first image onto a portion of the first transfer layer of the intermediate transfer medium using the first colorant layer of the thermal transfer sheet, a first transfer step of transferring the second transfer layer of the thermal transfer sheet onto the first transfer layer on which the first image is formed so as to expose at least a portion of a region on which the first image of the first transfer layer is not formed, a second image formation step of forming a second image on the exposed first transfer layer using the second colorant layer of the thermal transfer sheet, and a second transfer step of transferring the first transfer layer of the intermediate transfer medium together with the second transfer layer transferred on the first transfer layer onto the transfer receiving article.

The method for forming a print according to an embodiment of the present disclosure for solving the above-mentioned problem is also characterized in that the method includes a step of providing an intermediate transfer medium in which a first transfer layer is provided on a support, a step of providing a thermal transfer sheet, and a step of providing a transfer receiving article, the thermal transfer sheet has a first colorant layer, a second colorant layer including a masking layer, and a second transfer layer, the thermal transfer sheet is any of (i) a combination of a thermal transfer sheet in which the first colorant layer is provided on a substrate, a thermal transfer sheet in which the second colorant layer is provided on a substrate, and a thermal transfer sheet in which the second transfer layer is provided on a substrate, (ii) a combination of a thermal transfer sheet in which any one layer of the first colorant layer, the second colorant layer, and the second transfer layer is provided on a substrate and a thermal transfer sheet in which the other two layers are provided on a substrate so as being frame sequentially, and (iii) a thermal transfer sheet in which the first colorant layer, the second colorant layer, and the second transfer layer are provided on a substrate so as being frame sequentially, and the method includes a first image formation step of combining the intermediate transfer medium with the thermal transfer sheet to form a first image onto a portion of the first transfer layer of the intermediate transfer medium using the first colorant layer of the thermal transfer sheet, a first transfer step of transferring the second transfer layer of the thermal transfer sheet onto the first image so as to expose at least a portion of a region on which the first image of the first transfer layer is not formed, a second image formation step of forming a second image on the exposed first transfer layer using the second colorant layer of the thermal transfer sheet, and a second transfer step of transferring the first transfer layer of the intermediate transfer medium together with the second transfer layer transferred on the first transfer layer onto the transfer receiving article.

The thermal transfer sheet according to an embodiment of the present disclosure for solving the above-mentioned problem is a thermal transfer sheet having colorant layers, characterized in that a first colorant layer, a transfer layer, and a second colorant layer are provided on one surface of a substrate, so as being frame sequentially, the transfer layer is provided releasably from the substrate, and when an assembly of the first colorant layer, the transfer layer, and the second colorant layer is taken as one unit, a plurality of the unit is repeatedly provided side by side on the same surface of the substrate.

The transfer layer also may have a layered structure in which a receiving layer and a masking layer are layered in this order from the side of the substrate.

Either one or both of the first colorant layer and the second colorant layer may be a colorant layer(s) containing a sublimable dye or fluorescent dye or a thermally fusible ink layer(s).

The first colorant layer and the second colorant layer each may be a colorant layer containing a sublimable dye.

The first colorant layer and the second colorant layer also may be any of a yellow colorant layer, a magenta colorant layer, and a cyan colorant layer. Either one or both of the first colorant layer and the second colorant layer may be constituted by a layer in which at least two or more colorant layers selected from the group of a yellow colorant layer, a magenta colorant layer, and a cyan colorant layer are provided side by side on the same surface of the substrate.

The receiving layer may contain a cellulose-based resin. The cellulose-based resin may be either one or both of a cellulose acetate butyrate resin and a cellulose acetate propionate resin.

The combination of a thermal transfer sheet and an intermediate transfer medium according to an embodiment of the present disclosure for solving the above-mentioned problem is characterized in that the thermal transfer sheet is a thermal transfer sheet having the features described above.

The combination of a thermal transfer sheet and an intermediate transfer medium according to an embodiment of the present disclosure for solving the above-mentioned problem is characterized in that the thermal transfer sheet has a first colorant layer, a second colorant layer, and a second transfer layer, and is any of (i) a combination of a thermal transfer sheet in which the first colorant layer is provided on a substrate, a thermal transfer sheet in which the second colorant layer is provided on a substrate, and a thermal transfer sheet in which the second transfer layer is provided on a substrate, (ii) a combination of a thermal transfer sheet in which any one layer of the first colorant layer, the second colorant layer, and the second transfer layer is provided on a substrate and a thermal transfer sheet in which the other two layers are provided on a substrate so as being frame sequentially, and (iii) a thermal transfer sheet in which the first colorant layer, the second colorant layer, and the second transfer layer are provided on a substrate so as being frame sequentially.

Advantageous Effects of Invention

In accordance with the method for forming a print, the thermal transfer sheet, and the combination of a thermal transfer sheet and an intermediate transfer medium according to the embodiment of the present disclosure, a print having a stereoscopic image or a print having high designability can be easily formed.

DESCRIPTION OF EMBODIMENTS

Figure 1:
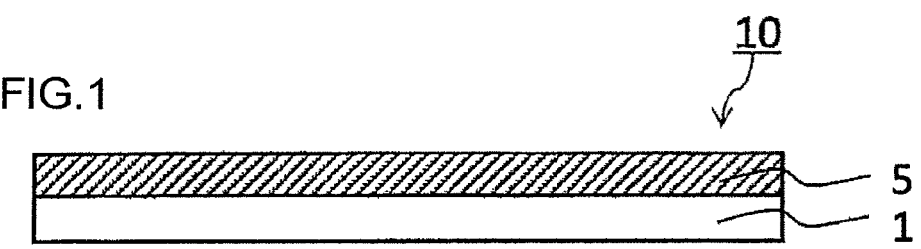
FIG. 1 is a schematic sectional view showing one example of an intermediate transfer medium that is used for a method for forming a print according to one embodiment.

The present invention now will be described with reference to the drawings. Note that the present invention can be implemented in many different modes and should not be construed as being limited to the description of embodiments illustrated below. In the drawings, components may be shown schematically regarding the width, thickness, shape and the like, in comparison with the actual embodiments, for the sake of clearer illustration. The schematic drawings are merely illustrative and do not limit the interpretations of the present invention in any way. In the specification and the drawings of the present application, components that have substantially the same functions as those described before with reference to a previous drawing bear the identical reference signs thereto, and detailed descriptions thereof may be omitted.

<<Method for Forming Print>>

The method for forming a print according to an embodiment of the present disclosure (hereinafter, it is referred to as the method for forming a print according to one embodiment) is characterized in that the method includes a step of providing an intermediate transfer medium 10 in which, on one surface of a support 1, a first transfer layer (5) is provided releasably from the support 1 (see FIGS. 1 and 2), a step of providing a thermal transfer sheet 100, and a step of providing a transfer receiving article 200, the thermal transfer sheet 100 has a first colorant layer (51), a second colorant layer (52), and a second transfer layer (55), and is any of (i) a combination of a thermal transfer sheet in which the first colorant layer (51) is provided on a substrate 50 and a thermal transfer sheet in which the second colorant layer (52) is provided on a substrate 50, (ii) a combination of thermal transfer sheet in which any one of the first colorant layer (51), the second colorant layer (52), and the second transfer layer (55) is provided on a substrate 50 and a thermal transfer sheet in which the other two layers are provided on a substrate 50 so as being frame sequentially, and (iii) a thermal transfer sheet in which the first colorant layer (51), the second colorant layer (52), and the second transfer layer (55) are provided on a substrate 50 so as being frame sequentially, and the method includes a first image formation step of combining the intermediate transfer medium 10 with the thermal transfer sheet 100 to form a first image (20) onto the first transfer layer (5) of the intermediate transfer medium 10 using the first colorant layer (51) of the thermal transfer sheet 100 (see FIGS. 9(*a*), 10(*a*), and 11(*a*)), a first transfer step of transferring the second transfer layer (55) of the thermal transfer sheet 100 onto the first transfer layer (5) on which the first image (20) has been formed (see FIGS. 9(*b*), 10(*b*), and 11(*b*)), a second image formation step of forming a second image (30) on the second transfer layer (55) by using the second colorant layer (52) of the thermal transfer sheet 100 (see FIGS. 9(*c*), 10(*c*), and 11(*c*)), and a second transfer step of transferring the first transfer layer (5) of the intermediate transfer medium together with the second transfer layer (55) transferred on the first transfer layer (5) onto the transfer receiving article 200 (see FIGS. 9(*d*), 10(*d*), and 11(*d*)). A laminate of the first transfer layer (5) of the intermediate transfer medium 10 and the second transfer layer (55) transferred on the first transfer layer (5) is herein referred to a transfer foil 60. Hereinbelow, the case where the thermal transfer sheet 10 to be used in the method for forming a print according to one embodiment is a thermal transfer sheet in which the first colorant layer (51), the second colorant layer (52), and the second transfer layer (55) are provided on the substrate 50 so as being frame sequentially, that is, the case of the above-described form (iii) will be principally described.

According to the method for forming a print of one embodiment, a print having a stereoscopic image can be easily formed. Specifically, according to the method for forming a print of one embodiment, it is possible to form a transfer foil 60 in which the first image (20) and the second image (30) are stereoscopically disposed in the thickness direction with a predetermined interval on the support 1 of the intermediate transfer medium 10 (see FIGS. 9(*c*), 10(*c*), and 11(*c*)), and it is possible to obtain a print 300 in which the first image (20) and the second image (30) are stereoscopically disposed in the thickness direction with a predetermined interval by transferring the transfer foil 60 onto the transfer receiving article 200. When the thermal transfer sheet of the above-described form (iii) is used, it is possible to obtain a print 300 in which the first image (20) and the second image (30) are stereoscopically disposed by use of one intermediate transfer medium and one thermal transfer sheet, without using a plurality of intermediate transfer medium or a plurality of thermal transfer sheets. According to the method for forming a print of one embodiment, various problems caused by a direct contact of the first image (20) with the second image (30), such as image bleeding can be suppressed.

Hereinafter, respective steps will be specifically explained. For convenience of explanation, the thickness of each layer to be provided on the substrate and the like are exaggeratedly shown in embodiments shown in each of figures.

<Step for Providing Intermediate Transfer Medium>

The present step is a step of providing an intermediate transfer medium 10 including a support 1 and a first transfer layer (5), the support 1 being releasably provided on the first transfer layer (5), as shown in FIG. 1. Hereinafter, the intermediate transfer medium 10 provided in the present step will be described with reference to one example.

(Support)

The support 1 is an essential component in the intermediate transfer medium 10 to be used in the method for forming a print of one embodiment, and is provided in order to retain the first transfer layer (5). There is no particular limitation with respect to the support, and unstretched or stretched plastic films, for instance, polyesters having high heat resistance such as polyethylene terephthalate and polyethylene naphthalate; polypropylene; polycarbonate; cellulose acetate; polyethylene derivatives; polyamides, and polymethylpentene may be enumerated. Composite films obtained by laminating two or more of these materials can be also used. The thickness of the support may be appropriately selected depending on the materials such that the strength and heat resistance will be suitable. The thickness is usually in the range of 4 µm or more and 30 µm or less, preferably in the range of 6 µm or more and 20 µm or less.

(First Transfer Layer)

Figure 2:
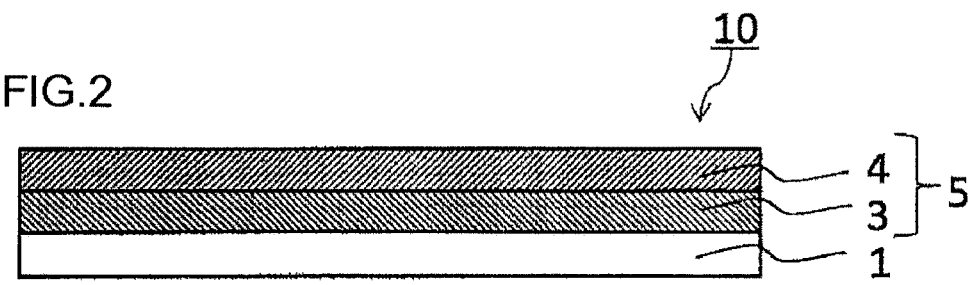
FIG. 2 is a schematic sectional view showing one example of an intermediate transfer medium that is used for a method for forming a print according to one embodiment.

As shown in FIGS. 1 and 2, the first transfer layer (5) is provided on the support 1. The first transfer layer (5) is a layer that is provided releasably from the support 1, is released from the support 1 by thermal transfer, and transferred together with the second transfer layer (55) on which the second image (30) described below is formed onto the transfer receiving article 200.

As shown in FIG. 2, the first transfer layer (5) as an example has a single-layer structure or layered structure including the receiving layer 4 (it is also referred to as the transferable receiving layer, optionally) (in the embodiment shown in FIG. 2, has a layered structure in which a protective layer 3 and the receiving layer 4 are layered in this order from the side of the support 1.). The receiving layer 4 in this case is located farthest from the support 1, among the layers constituting the transfer layer 5, in other words, located on the outermost surface of the intermediate transfer medium 10. The receiving layer has dye receptivity for receiving a dye contained in the first colorant layer (51) of the thermal transfer sheet 100 described below, for example, a sublimable dye or a fluorescent dye.

In the first image formation step described below, in the case where the first colorant layer (51) is transferred onto the first transfer layer (5) using a thermally fusible ink layer as the first colorant layer (51) by a thermal melt-type thermal transfer method to form a first image on the first transfer layer (5) of the intermediate transfer medium 10, the first transfer layer (5) may not include the receiving layer 4. The first transfer layer (5) may be a heat-seal panel described below, for example. That is, a medium referred to as a so-called protective layer transfer sheet may be used as an intermediate transfer medium. Hereinafter, the case where the first transfer layer (5) has a single-layer structure or has a layered structure and is a first transfer layer (5) in which the receiving layer 4 is located farthest from the support 1, among the layers constituting the first transfer layer (5), will be explained as an example.

"Receiving Layer"

As materials constituting the receiving layer 4, conventionally known resin materials that can receive sublimable dyes, fluorescent dyes and the like can be used. As such resin materials, polyolefin type resins such as polypropylene, halogenated resins such as polyvinyl chloride and polyvinylidene chloride, vinyl type resins such as polyvinyl acetate, vinyl chloride-vinyl acetate copolymers, ethylene-vinyl acetate copolymers, and polyacrylic esters, polyester resins such as polyethylene terephthalate and polybutylene terephthalate, polystyrene type resins, polyamide type resins, copolymers of an olefin such as ethylene or propylene and another vinyl polymer, ionomers and cellulose-based resins such as cellulose diastase, and polycarbonate may be enumerated.

The receiving layer 4 may also contain various release agents for improving the releasability of the thermal transfer sheet 100 from the first colorant layer (51) in addition to the above-described resin materials. As the release agents, solid waxes such as polyethylene wax, amide wax, and Teflon® powder, fluorine-based or phosphoric acid ester-based surfactants, silicones, and silicone oils may be enumerated.

The receiving layer 4 can be formed by dissolving or dispersing a single material or a plurality of materials selected from the aforementioned materials, various additive materials to be added as required and the like into an appropriate solvent such as water or an organic solvent to prepare a coating liquid for receiving layer, coating this coating liquid onto the support 1 or an optional layer to be provided on the support 1, for example, a protective layer 3 using a conventionally known coating device, and drying the coated liquid. There is no particular limitation with respect to the coating device for the coating liquid for receiving layer, and gravure coaters, roll coaters, wire bars, and screen printers may be enumerated. The same applies to coating devices for various coating liquids. The thickness of the receiving layer 4 is usually in the range of 0.5 µm or more and 10 µm or less.

"Protective Layer"

As shown in FIG. 2, the first transfer layer (5) may have a layered structure in which the protective layer 3 and the receiving layer 4 are layered in this order from the side of the support 1. As the materials constituting the protective layer 3, polyester resins, polycarbonate resins, acryl resins, ultraviolet absorbing resins, epoxy resins, polystyrene resins, polyurethane resins, acrylic urethane resins, and silicone-modified forms of these resins, mixtures of these resins, ionizing radiation-curable resins, and ultraviolet absorbing resins may be enumerated.

In respect to a protective layer containing an ionizing radiation-curable resin, such an ionizing radiation-curable resin has particularly excellent plasticizer resistance and abrasion resistance, and therefore can be suitably used as a binder for the protective layer. There is no particular limitation with respect to the ionizing radiation-curable resin, and thus it can be suitably selected from among the ionizing radiation-curable resins known in the art. For instance, it is possible to use ones obtained by crosslinking and curing a radically polymerizable polymer or oligomer by irradiation of ionizing radiation or optionally polymerizing and cross-linking such a polymer or oligomer by electron beam or ultraviolet light using a photo-polymerization initiator additively. A protective layer containing an ultraviolet absorbing resin is excellent in that the layer imparts lightfastness to prints.

As an ultraviolet ray absorbing resin, for instance, a resin which is prepared by reacting and linking a reactive ultraviolet ray absorber to a thermoplastic resin or the ionizing radiation-curable resin mentioned above can be used. More specifically, ones prepared by introducing a reactive group such as an addition—polymerizable double bond (for instance, a vinyl group, acryloyl group, and methacryloyl group), alcoholic hydroxyl group, amino group, carboxyl group, epoxy group, and isocyanate group into a non-reactive organic ultraviolet absorber known in the art such as salicylate series, benzophenon series, benzotriazole series, substituted acrylonitrile series, nickel-chelate series, and hindered amine series may be enumerated.

Furthermore, for example, slip agents, plasticizers, fillers, antistatic agents, anti-blocking agents, cross-linking agents, antioxidants, ultraviolet absorbers, light stabilizers, colorants such as dyes and pigments, and other additive materials may be added as required. As the method for forming a protective layer, one or two or more resin materials exemplified above are dissolved or dispersed by an appropriate solvent to prepare a coating liquid for protective layer, this coating liquid is coated onto the support 1 or an optional layer to be provided on the support 1, and the coated liquid is dried to thereby enable the protective layer to be formed. The thickness of the protective layer is usually in the range of 0.1 µm or more and 50 µm or less, preferably in the range of 1 µm or more and 20 µm or less.

"Exfoliate Layer"

The layer located nearest from the support 1 among the layers constituting the first transfer layer (5) may be an exfoliate layer (not shown). Allowing the first transfer layer (5) to have an exfoliate layer can improve the transferability of the first transfer layer (5) from the support 1 (it is referred to as the release property, optionally).

There is no particular limitation with respect to the resin material constituting the exfoliate layer, and waxes, silicone waxes, silicone resins, silicone-modified resins, fluorine resins, modified fluorine resins, polyvinyl alcohol, acryl resins, thermally cross-linkable epoxy-amino resins, and thermally cross-linkable alkyd-amino resins may be enumerated. A resin material having dye receptivity for sublimable dyes and fluorescent dyes also may be contained in the exfoliate layer. In this case, as described below, after the transfer foil 60 in which the first transfer layer (5), the first image (20), the second transfer layer (55), and the second image (30) are layered in this order is transferred onto a transfer receiving article, the dyes contained in the colorant layers of the thermal transfer sheet are transferred onto the exfoliate layer located on the outermost surface to thereby enable a further image to be formed.

There is no particular limitation with respect to the method for forming an exfoliate layer. The exfoliate layer can be formed by dissolving or dispersing the above-described resin in an appropriate solvent to prepare a coating liquid for exfoliate layer, coating this coating liquid onto the support 1, and drying the coated liquid. The thickness of the exfoliate layer is preferably in the range of 0.5 µm or more and 5 µm or less.

In order to improve the interlayer adhesion between each of the layers constituting the first transfer layer (5), a primer layer may be provided between each of the layers constituting the first transfer layer (5). As the resin materials constituting the primer layer, ultraviolet absorbing resins, polyester type resins, polycarbonate type resins, butyral type resins, polyurethane type resins, polyester type resins, polyamide type resins, epoxy type resins, phenolic resins, polyvinyl chloride type resins, polyvinyl acetate type resins, polyvinyl chloride-vinyl acetate copolymers, acid-modified polyolefin type resins, copolymers of ethylene with vinyl acetate, acrylic acid or the like, (meth)acryl type resins, polyvinyl alcohol type resins, polyvinyl acetal resins, polybutadiene type resins, and rubber-based compounds may be enumerated. Fillers such as microsilica and polyethylene wax may be combined.

<Step of Providing Thermal Transfer Sheet>

The present step is a step of providing a thermal transfer sheet having a first colorant layer (51), a second colorant layer (52), and a second transfer layer (55), the thermal transfer sheet being (i) a combination of a thermal transfer sheet in which the first colorant layer (51) is provided on a substrate 50, a thermal transfer sheet in which the second colorant layer (52) is provided on a substrate 50, and a thermal transfer sheet in which the second transfer layer (55) is provided on a substrate 50 (not shown), (ii) a combination of a thermal transfer sheet in which any one of the first colorant layer (51), the second colorant layer (52), and the second transfer layer (55) is provided on a substrate 50 and a thermal transfer sheet in which the other two layers are provided on a substrate 50 so as being frame sequentially (not shown), or (iii) a thermal transfer sheet in which the first colorant layer (51), the second colorant layer (52), and the second transfer layer (55) are provided on a substrate 50 so as being frame sequentially (see FIGS. 3 to 8).

(Substrate)

The substrate 50 is an essential component in the thermal transfer sheet 100 used in the method for forming a print of one embodiment, and is provided in order to retain the first colorant layer (51), the second transfer layer (55), the second colorant layer (52), and a back face layer to be provided optionally on the other surface of the substrate 50. There is no particular limitation with respect to the material of the substrate 50, but the material desirably endures heat applied to the thermal transfer sheet in the first image formation step, the first transfer step, and the second image formation step described below and has a mechanical strength to the extent of being able to handle without a hitch. As the substrate 50 like this, various plastic films or sheets such as polyesters such as polyethylene terephthalate, polycarbonate, polyimide, polyether imide, cellulose derivatives, polyethylene, polypropylene, polystyrene, acryl, polyvinyl chloride, polyvinylidene chloride, nylon, polyether ether ketone, and the like may be enumerated. The thickness of the substrate 50 can be appropriately set such that the strength and heat resistance will be suitable. The thickness is usually in the range of 2.5 µm or more and 50 µm or less.

When a thermal transfer sheet in the form of the above-described (i) or (ii) is used as the thermal transfer sheet 100, as substrates to support the first colorant layer (51), the second transfer layer (55), and the second colorant layer (52), the same substrate may be used or different substrates may be used.

(First Colorant Layer)

The first colorant layer (51) is a layer to be used for forming the first image (20) on the first transfer layer (5) of the intermediate transfer medium 10 in the first image formation step described below. Hereinafter, the case where the first colorant layer (51) is a colorant layer to be used in the sublimation-type thermal transfer method and the case where the first colorant layer (51) is a colorant layer to be used in the thermal melt-type thermal transfer method are described separately. The sublimation-type thermal transfer method is a method including applying energy corresponding to image information from a heating device such as a thermal head or the like to allow the colorant component contained in the colorant layer to migrate onto a transfer receiving article having dye receptivity to thereby form an image. The thermal melt-type thermal transfer method is a method including applying energy corresponding to image information from a heating device such as a thermal head or the like to transfer the melted and softened colorant layer onto a transfer receiving article to thereby form an image.

"First Colorant Layer to be Used for Sublimation-Type Thermal Transfer Method"

The first colorant layer (51) to be used for the sublimation-type thermal transfer method contains a binder resin and a colorant component. As the colorant component, sublimable dyes and fluorescent dyes may be enumerated.

Figure 7:
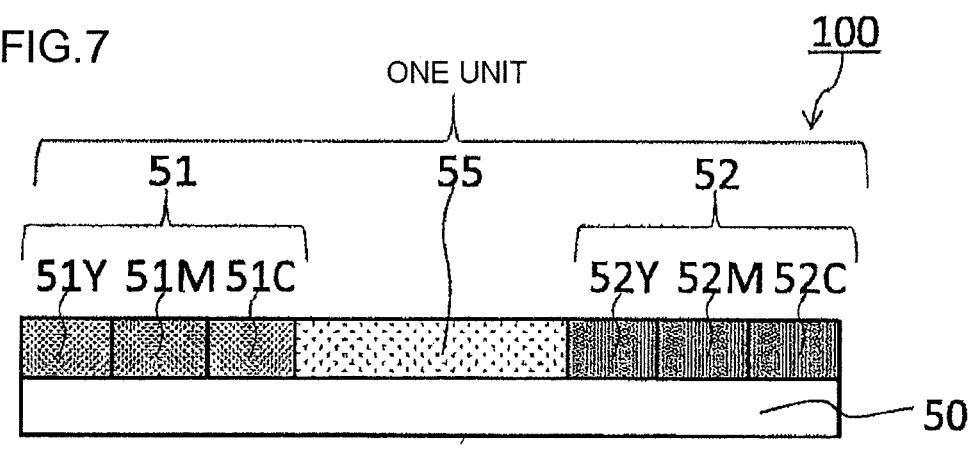
FIG. 7 is a schematic sectional view showing one example of a thermal transfer sheet that is used for a method for forming a print according to one embodiment.

The first colorant layer (51) may be constituted by a single layer or may be constituted by two or more layers. For example, in the case where the first image (20) formed in the first image formation step described below is a monochromatic image, the first colorant layer (51) may be constituted by a single colorant layer. In the case where the first image (20) is a full-color image, a plurality of colorant layers each containing a sublimable dye having a different hue, such as a yellow colorant layer 51Y, a magenta colorant layer 51M, and a cyan colorant layer 51C, arranged on the same surface of the substrate 50 may be used as the first colorant layer (51), as shown in FIG. 7. Two colorant layers, among the plurality of colorant layers each containing a sublimable dye having a different hue, such as a yellow colorant layer 51Y, a magenta colorant layer 51M, and a cyan colorant layer 51C, arranged on the same surface of the substrate 50 may be used as the first colorant layer (51).

As the sublimable dyes, dyes having a sufficient color density and resistance to discoloration and fading due to light, heat, temperature and the like are preferred. As such sublimable dyes, diaryl methane-based dyes, triaryl methane-based dyes, thiazole-based dyes, merocyanine dyes, pyrazolone dyes, methine-based dyes, indoaniline-based dyes, pyrazolomethine-based dyes, azomethine-based dyes such as acetophenoneazomethine, pyrazoloazomethine, imidazoleazomethine, imidazoazomethine, and pyridoneazomethine, xanthene-based dyes, oxazine-based dyes, cyanostyrene-based dyes such as dicyanostyrene and tricyanostyrene, thiazine-based dyes, azine-based dyes, acridine-based dyes, benzeneazo-based dyes, azo-based dyes such as, pyridoneazo, thiopheneazo, isothiazoleazo, pyrroleazo, pyrazoleazo, imidazoleazo, thiadiazoleazo, triazoleazo, and disazo, spiropyran-based dyes, indolinospiropyran-based dyes, fluoran-based dyes, rhodaminelactam-based dyes, naphthoquinone-based dyes, anthraquinone-based dyes, and quinophthalone-based dyes may be enumerated. Specifically, red dyes such as MS Red G (Mitsui Toatsu Chemicals Co., Ltd.), Macrolex Red Violet R (Bayer AG), CeresRed 7B (Bayer AG), and Samaron Red F3BS (Mitsubishi Chemical Corporation), yellow dyes such as Holon Brilliant yellow 6GL (Clariant), PTY-52 (Mitsubishi Chemical Industries, Ltd.), and MACROLEX Yellow 6G (Bayer AG), and blue dyes such as Kayaset® Blue 714 (Nippon Kayaku Co., Ltd.), Holon Brilliant Blue S-R (Clariant), MS Blue 100 (Mitsui Toatsu Chemicals Co., Ltd.), and C.I. Solvent blue 63 may be enumerated.

As the binder resin to carrying the sublimable dye described above, resins having heat resistance and a moderate affinity with the sublimable dye are preferred. As such binder resins, cellulose-based resin, such as nitro cellulose, cellulose acetate butyrate, and cellulose acetate propionate; vinyl type resins, such as polyvinyl acetate, polyvinyl butyral, and polyvinyl acetal; acryl resins such as poly(meth)acrylate and poly(meth)acrylamide; polyurethane type resins; polyamide type resins; and polyester type resins may be enumerated.

As the fluorescent dye, diaminostilbene disulfonic acid derivatives, imidazole derivatives, coumarin derivatives, derivatives of triazole, carbazole, pyridine, naphthalic acid, and imidazolone, coloring matter such as fluorescein and eosine, and compounds having a benzene ring(s) such as anthracene may be enumerated. Fluorescent dyes have a property of absorbing energy when stimulated by sunlight, electric lamp light, or an ultraviolet ray and converting the energy into light during the stimulation to become luminous (fluorescent). The same applies to fluorescent pigments described below.

As the binder resin to carry the fluorescent dye described above, vinyl type resins, such as polyvinyl acetate, polyvinyl butyral, and polyvinyl acetal, cellulose-based resins, melamine type resins, polyester type resins, polyamide type resins, polyolefin type resins, polyurethane type resins, acryl type resins, styrene type resins, styrene-acryl copolymers, ethylene-vinyl acetate copolymers, chlorinated polypropylene, chlorinated rubber, and thermoplastic elastomers, such as styrene-butadiene rubber may be enumerated.

There is no particular limitation with respect to the contents of the binder resin and sublimable dyes and fluorescent dyes as the colorant components in the first colorant layer described above, and the contents can be appropriately set using the first colorant layer (51), depending on the image concentration and the like required for the first image (20) to be formed on the first transfer layer (5) of the intermediate transfer medium 10.

The first colorant layer (51) may also contain additive materials such as inorganic particles and organic particulates in addition to the binder resin and colorant components. As the inorganic particles, talc, carbon black, aluminum, and molybdenum disulfide may be enumerated, and as the organic particulates, polyethylene waxes and silicone resin particulates may be enumerated. The first colorant layer (51) as an example may contain a release agent. As the release agent, modified or non-modified silicone oils (including those called silicone resins), phosphoric acid ester, and fatty acid esters may be enumerated As a method for forming the first colorant layer (51) of the embodiment described above, for example, a binder resin, colorant components, and additive materials and a release agent to be added as required are dissolved or dispersed in an appropriate solvent to prepare a coating liquid for first colorant layer, this coating liquid is coated onto the substrate 50 or an optional layer to be provided on the substrate 50, and the coated liquid is dried to thereby enable the first colorant layer to be formed. The thickness of the first colorant layer (51) is generally in the range of 0.2 μm or more and 2.0 μm or less.

"First Colorant Layer to be Used for Thermal Melt-Type Thermal Transfer Method"

The first colorant layer (51) to be used for the thermal melt-type thermal transfer method (hereinafter, it is referred to as the first colorant layer of a second embodiment) contains a binder and a colorant. The first colorant layer of the second embodiment serves as a so-called thermally fusible ink layer.

As the binder contained in the first colorant layer (51) to be used for the thermal melt-type thermal transfer method, resin components and wax components may be enumerated. As the resin components, ethylene-vinyl acetate copolymers, ethylene-acryl acid ester copolymers, polyethylene, polystyrene, polypropylene, polybutene, petroleum resins, polyvinyl chloride resins, polyvinyl chloride-vinyl acetate copolymers, polyvinyl alcohol, vinylidene chloride resins, acryl resins, methacryl resins, polyamide, polycarbonate, fluorine resins, polyvinyl formal, polyvinyl butyral, acetyl cellulose, nitrocellulose, polyvinyl acetate, polyisobutylene, ethyl cellulose, and polyacetal may be enumerated. As wax components, microcrystalline wax, carnauba wax, and paraffin wax may be enumerated. Additionally, various waxes, such as Fischer-Tropsch wax, various low molecular weight polyethylenes, tree wax, beeswax, spermaceti, insect wax, wool wax, shellac wax, candelilla wax, petrolactam, polyester wax, partially denatured waxes, fatty acid esters, and fatty acid amides may be enumerated.

The colorant contained in the first colorant layer (51) to be used for the thermal melt-type thermal transfer method may be appropriately selected from known organic or inorganic pigments or dyes. For example, colorants that have a sufficient color density and are not easily discolored or faded by light, heat or the like are preferred. The colorant also may be a substance that develops a color by heating or a substance that develops a color when coming in contact with a component coated on the surface of the transfer receiving article. The color of the colorant is not limited to cyan, magenta, yellow, and black and colorants of various colors may be used. For example, fluorescent pigments and the like may be employed. The fluorescent pigments, which are principally inorganic phosphor materials, are pigments that are mainly based on crystals of oxide, sulfide, silicate, phosphate, tungstate or the like of Ca, Ba, Mg, Zn, Cd or the like and obtained by firing the crystals with addition of a metal element such as Mn, Zn, Ag, Cu, Sb, and Pb or a rare earth element such as lanthanoids as an activator. As specific compounds of these inorganic phosphor materials, for example, phosphor materials based on oxides such as calcium tungstate and magnesium tungstate, phosphor materials based on sulfides such as calcium sulfide-bismuth, zinc sulfide-silver, zinc sulfide-copper, and zinc sulfide-gold-aluminum, and phosphor materials based on oxides such as zinc oxide-zinc, yttrium vanadate-europium, yttrium oxide-europium, yttrium sulfate-europium, yttrium sulfate-terbium, gadolinium sulfate-terbium, lantan sulfate-terbium, lanthanum acid bromide-terbium may be enumerated.

There is no particular limitation with respect to the contents of the binder and colorant in the first colorant layer of the embodiment described above, and the contents can be appropriately set using the first colorant layer (51), depending on the image concentration and the like required for the first image (20) to be formed on the first transfer layer.

As a method for forming the first colorant layer (51) of the embodiment described above, for example, a binder, a colorant, and additive materials to be added as required are dissolved or dispersed in an appropriate solvent to prepare a coating liquid for first colorant layer, this coating liquid is coated onto the substrate 50 or an optional layer, for example, a release layer, to be provided on the substrate 50, and the coated liquid is dried to thereby enable the first colorant layer to be formed. The thickness of the first colorant layer (51) of the second embodiment is generally in the range of 0.5 μm or more and 10 μm or less.

As the thermal transfer sheet having the first colorant layer (51), a plurality of thermal transfer sheets each having a different hue may be used. For example, as the thermal transfer sheet having the first colorant layer (51), a thermal transfer sheet having a yellow colorant layer, a thermal transfer sheet having a magenta colorant layer, and a thermal transfer sheet having a cyan colorant layer may be used in combination. This applies to a second colorant layer (52) described below.

(Second Transfer Layer)

The thermal transfer sheet 100 used for a method for forming a print according to one embodiment has a second transfer layer (55). The thermal transfer sheet 100 as an example has a structure in which the first colorant layer (51) and the second transfer layer (55) are provided on the substrate 50 so as being frame sequentially, as shown in FIGS. 3 to 9. Instead of the thermal transfer sheet of this embodiment, a thermal transfer sheet in which the second transfer layer (55) is provided on the substrate 50 may be used in combination with a thermal transfer sheet having the first colorant layer (51) and the second colorant layer (52).

The second transfer layer (55) is a layer that is provided releasably from the substrate 50, is released from the substrate 50 by thermal transfer, and transferred onto the first transfer layer (5) of the intermediate transfer medium 10 on which the first image (20) has been formed. Additionally, in a second image formation step described below, a second image (30) is formed on the second transfer layer (55) transferred on the first transfer layer (5) by means of the second colorant layer (52) of the thermal transfer sheet 100.

The second transfer layer can be appropriately set in accordance with the second colorant layer (52) of the thermal transfer sheet. For example, in the case where the colorant component contained in the second colorant layer (52) is allowed to migrate onto the second transfer layer (55) to form the second image (30) by the sublimation-type thermal transfer method, the second transfer layer (55) contains a receiving layer (it is also referred to as a transferable receiving layer, optionally). Meanwhile, in the case where a melted and softened second colorant layer (52) is transferred onto the second transfer layer (55) to form the second image (30) by the thermal melt-type thermal transfer method, the second transfer layer (55) may include no receiving layer.

Figure 3:
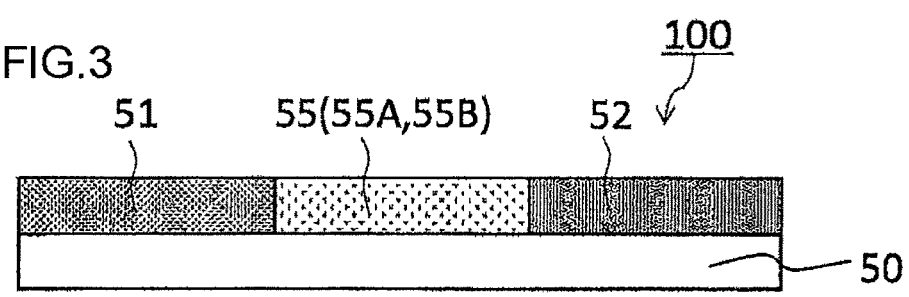
FIG. 3 is a schematic sectional view showing one example of a thermal transfer sheet that is used for a method for forming a print according to one embodiment.
Figure 4:
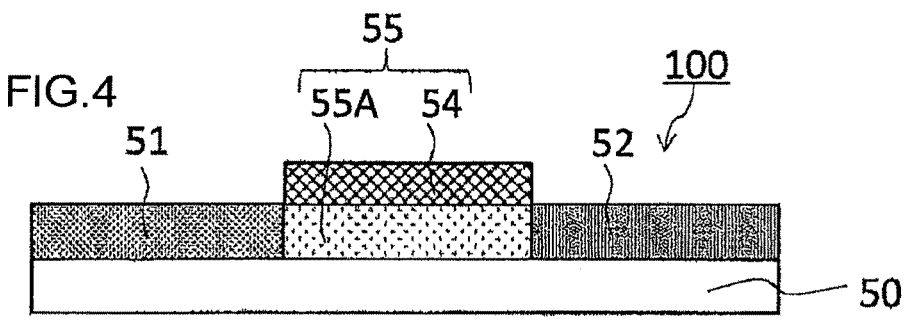
FIG. 4 is a schematic sectional view showing one example of a thermal transfer sheet that is used for a method for forming a print according to one embodiment.

The second transfer layer (55) as an example has a single-layer structure or a layered structure including a receiving layer 55A, as shown in FIGS. 3 and 4. The receiving layer 55A in this case is located nearest from the substrate 50 among the layers constituting the second transfer layer (55), having dye receptivity for receiving the colorant component contained in the second colorant layer (55) of the thermal transfer sheet 100 described below.

As the receiving layer 55A, the receiving layer described for the intermediate transfer medium 10 described above can be appropriately selected and used.

In a second transfer layer (55) of a preferred embodiment, the receiving layer 55A contains a cellulose-based resin. According to the second transfer layer (55) including the receiving layer 55A containing a cellulose-based resin, it is possible to sufficiently satisfy the transferability of the receiving layer, which is located on the transfer interface. Even in the case where energy applied to the thermal transfer sheet 100 is increased when the second transfer layer (55) is transferred onto the first transfer layer (5), it is possible to make the transferability of the second transfer layer (55) including the receiving layer 55A better. In other words, it is possible to make the transferability better when the second transfer layer (55) including the receiving layer 55A is transferred onto the first transfer layer (5) over a wide energy range. The transferability of the second transfer layer (55) referred to herein is an index that indicates, when the second transfer layer (55) is transferred onto the first transfer layer (5) of the intermediate transfer medium 10, whether it is possible to accurately transfer (migrate) the second transfer layer (55) onto the first transfer layer (5) without leaving the second transfer layer (55) on the side of the substrate 50 or without integrating the first transfer layer (5) of the intermediate transfer medium 10 with the second transfer layer (55) of the thermal transfer sheet 100. High transferability means that, when energy is applied to the thermal transfer sheet 100 to thereby transfer the second transfer layer (55) onto the first transfer layer (5) of the intermediate transfer medium, it is possible to accurately migrate the second transfer layer (55) onto the first transfer layer (5) without leaving the second transfer layer (55) corresponding to a region to which energy has been applied on the side of the substrate 50 or without integrating the first transfer layer (5) of the intermediate transfer medium 10 with the second transfer layer (55) of the thermal transfer sheet 100. Meanwhile, low transferability means that, when energy is applied to the thermal transfer sheet 100 to thereby transfer the second transfer layer (55) of the thermal transfer sheet 100 onto the first transfer layer (5) of the intermediate transfer medium 10, in a portion or the whole of the second transfer layer (55) corresponding to the region to which energy has been applied, the substrate 50 or a layer to be optionally provided on the substrate 50 (for example, an optional release layer described below) and the second transfer layer (55) cause thermal fusion, in other words, the substrate 50 or a layer to be optionally provided on the substrate 50 and the receiving layer 55A included in the second transfer layer (55) are thermally fused to thereby lead to integration of the first transfer layer (5) with the thermal transfer sheet without enabling the second transfer layer (55) to be released from substrate 50, or that the substrate 50 or a layer to be optionally provided on the substrate 50 and the receiving layer 55A included in the second transfer layer (55) are thermally fused, the second transfer layer (55), which should be originally released at the interface with the substrate or the optional layer to be provided on the substrate, is released between the layers constituting the second transfer layer (55), and thus, the whole or a portion of the receiving layer 55A, which should be transferred onto the first transfer layer (5), remains on the side of the substrate 50. Hereinafter, the receiving layer containing a cellulose-based resin will be specifically described.

As the cellulose-based resin, cellulose acetate resins, cellulose acetate butyrate resins, cellulose acetate propionate resins, nitro cellulose resins, and cellulose acetate may be enumerated. The receiving layer 55A of a preferred embodiment contains either one or both of a cellulose acetate butyrate resin and a cellulose acetate propionate resin. According to the receiving layer 55A containing a cellulose acetate butyrate resin or a cellulose acetate propionate resin, it is possible to make an improvement in the transferability of the second transfer layer (55) including the receiving layer 55A.

The receiving layer 55A may contain one cellulose-based resin singly or may contain two or more cellulose-based resins. The receiving layer 55A may contain another resin in addition to the cellulose-based resin.

The receiving layer 55A of a more preferred embodiment contains a cellulose-based resin having a number average molecule weight (Mn) of less than 70000, preferably 55000 or less, particularly preferably 40000 or less. According to the second transfer layer (55) including the receiving layer 55A of a more preferred embodiment, it is possible to make the foil cutting property better when the second transfer layer (55) is transferred onto the first transfer layer (5) of the intermediate transfer medium 10 in comparison to the second transfer layer (55), which includes the receiving layer 55A containing only a cellulose-based resin having a number average molecule weight (Mn) of 70000 or more as the cellulose-based resin.

The receiving layer 55A may contain two or more cellulose-based resins having a different number average molecular weight (Mn). In the receiving layer 55A of a preferred embodiment, at least one cellulose-based resin of the two or more cellulose-based resins is the cellulose-based resin having a preferred number average molecular weight (Mn) described above. The number average molecular weight (Mn) referred to herein means a molecular weight in terms of polystyrene standard, measured by gel permeation chromatography (GPC) in compliance with JIS-K-7252-1 (2008).

There is no particular limitation with respect to the content of cellulose-based resin. In the case of addition of an extremely small amount, for example, even in the case where the content of the cellulose-based resin is set to about 0.5% by mass based on the total solid content of the receiving layer 55A, it is possible to make the transferability of the second transfer layer (55) containing the receiving layer 55A better. In other words, according to the receiving layer 55A containing a cellulose-based resin, regardless of its content, it is possible to make the transferability of the second transfer layer (55) including the receiving layer 55A extremely better over a wide energy range in comparison with that of a receiving layer 55A not containing a cellulose-based resin. The upper limit of the content of the cellulose-based resin is not particularly limited and may be 100% by mass.

Although there is no limitation with respect to the content of the cellulose-based resin as described above, the content of the cellulose-based resin is desirably determined in consideration of the releasability from the second colorant layer (52) when the second image (30) is formed on the second transfer layer (55). In the case where measures to improve the releasability on the side of the second colorant layer (52), for example, in the case where the second colorant layer (52) contains a release agent or the like, an optional content may be used without consideration on the content of the cellulose-based resin. In contrast, in the case where no measure for the releasability is taken on the side of the second colorant layer (52), the content of the cellulose-based resin is preferably determined depending on the type of the resin contained in the second colorant layer (52). The releasability in this case depends on the type of the resin contained in the second colorant layer (52). For example, in the case where the resin contained in the second colorant layer (52) is a polyvinyl acetal resin or polyvinyl butyral resin and the second colorant layer (52) contains no release agent, the content of the cellulose-based resin is preferably less than 25% by mass based on the total mass of the receiving layer 55A. Even in the case where neither the receiving layer 55A nor the second colorant layer (52) contains a release agent and the like, use of a second colorant layer (52) that contains a resin having a good releasability from the receiving layer 55A containing a cellulose-based resin makes the releasability better irrespective of the content of the cellulose-based resin. That is, the content of the cellulose-based resin based on the total mass of the receiving layer 55A also can be 100% by mass. It is also possible to make an improvement in the releasability by allowing the receiving layer 55A to contain a release agent.

The receiving layer 55A may contain a resin other than the cellulose-based resin, a release agent, and the like. As the resin other than cellulose-based resins, polyolefin type resins such as polypropylene, halogenated resins such as polyvinyl chloride and polyvinylidene chloride, vinyl type resins such as polyvinyl acetate, polyvinyl chloride-vinyl acetate copolymers, ethylene-vinyl acetate copolymers, and polyacrylic acid esters, polyester resins, polystyrene type resins, and acryl type resins may be enumerated.

As the release agent, solid waxes such as polyethylene wax, amide wax, and Teflon® powder, fluorine-based or phosphoric acid ester-based surfactants, silicone oils, various modified silicone oils such as reactive silicone oils and curable silicone oils, and various silicone resins may be enumerated.

The receiving layer 55A containing a cellulose-based resin can be formed by dispersing or dissolving the above-described cellulose-based resin, a resin other than the cellulose-based resin to be added as required, and additive materials such as a release agent in an appropriate solvent to prepare a coating liquid for receiving layer, coating this coating liquid onto the substrate 50 or an optional layer to be provided on the substrate 50, and drying the coated liquid. There is no particular limitation with respect to the thickness of the receiving layer, and the thickness is usually in the range of 0.3 µm or more and 10 µm or less.

(Function Layer)

As shown in FIG. 4, a function layer 54 may be provided on the receiving layer 55A. The function layer 54 is a layer that constitutes the second transfer layer (55) and is transferred together with the receiving layer 55A onto the first transfer layer (5). The function layer 54 can be appropriately selected depending on functions required for the second transfer layer (55), for example, functions such as a masking property, adhesion, and the like, and there is no limitation with respect to specific functions. That is, there is not any limitation with respect to layers provided on the receiving layer 55A, and any layers, if different from the receiving layer 55A, may be provided. The function layer 54 may have a single-layer structure or may have a layered structure. Hereinafter, the function layer 54 will be described with reference to one example.

Figure 10A:
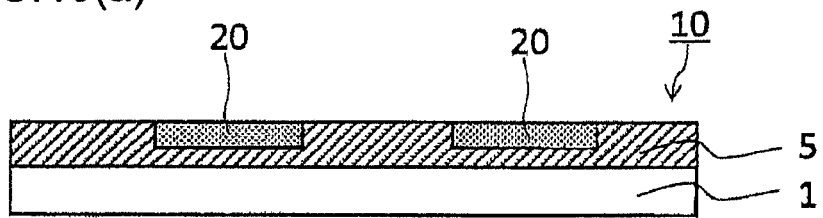
FIGS. 10(a) to 10(d) are each a schematic sectional view in a process drawing for explaining the method for forming a print according to one embodiment.
Figure 10B:
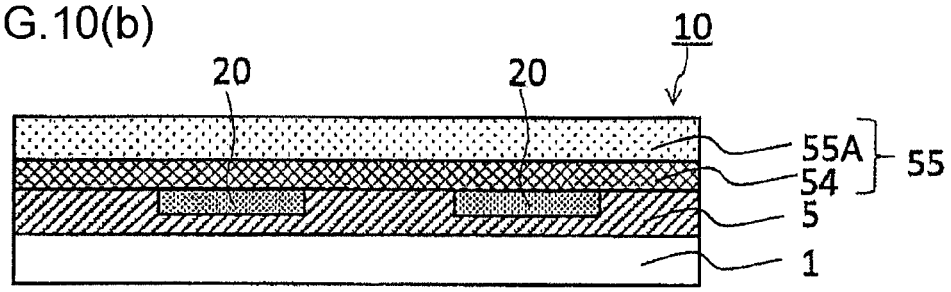
Figure 10C:
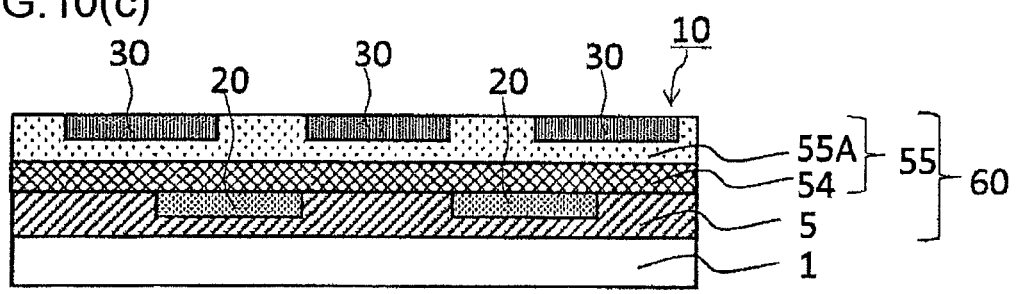
Figure 10D:
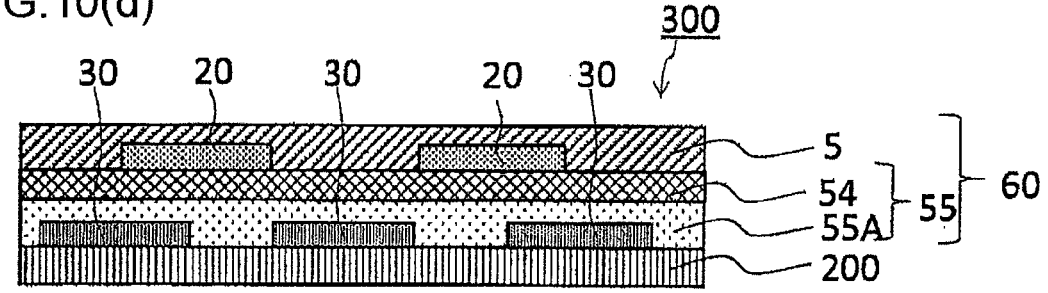

The function layer 54 as one example, as shown in FIG. 10(d), has a function of masking the first image (20) when a print 300 to be finally formed by a method of forming a print according to one embodiment is viewed from the side of the transfer receiving article 200. In other words, the function layer 54 has a function of masking the second image (30) when a print 300 to be finally formed by a method of forming a print according to one embodiment is viewed from is viewed from the side of the first transfer layer (5). Hereinafter, the function layer 54 having this function is referred to as a masking layer 54.

The masking layer 54 as one example is constituted by a binder resin and a colorant. As the binder resin, polyester resins, urethane resins, epoxy resins, phenol resins, acryl resins, and vinyl chloride-vinyl acetate copolymer may be enumerated. As the colorant, known colorants such as titanium oxide, zinc oxide, carbon black, iron oxide, yellow iron oxide, ultramarine, hologram powder, aluminum powder, metallic pigments, and pearl pigments may be enumerated. The masking layer 54 may contain one of these binder resins and may contain two or more of these. The same applies to the colorant.

There is no particular limitation with respect to the method for forming the masking layer 54, and the masking layer can be formed by dispersing or dissolving the binder resin exemplified as above, a colorant, and additive materials to be added as required in an appropriate solvent to prepare a coating liquid for masking layer, coating this coating liquid onto the receiving layer 55A, and drying the coated liquid.

There is no particular limitation with respect to the thickness of the masking layer 54, and the thickness may be appropriately set in consideration of the masking property by the masking layer 54. When the thickness of the masking layer 54 is less than 0.1 µm, the masking property tends to decrease. Considering this point, the thickness of the masking layer 54 is preferably 0.1 µm or more. The preferable upper value of the masking layer is not particularly limited, and the thickness may be of the order of 5 µm.

In the case where the second image (30) to be formed on the second transfer layer (55) is an image to be formed by the thermal melt-type thermal transfer method, the second transfer layer (55) may not include a receiving layer. For example, the second transfer layer (55) may be a transfer layer of a single-layer structure constituted singly by the masking layer 54.

It is also possible to provide an intermediate layer (not shown) between the receiving layer 55A and the masking layer 54 (function layer 54) in order to improve the foil tearing property of the second transfer layer (55), specifically, to suppress occurrence of tailing and character collapse when the second transfer layer (55) is transferred, or to improve the adhesion between the receiving layer 55A and the masking layer 54. Tailing referred to herein means a phenomenon in which, when the second transfer layer (55) is transferred onto the first transfer layer (5), the second transfer layer (55) is transferred such that the second transfer layer (55) protrudes, starting from the boundary between the transfer region and the non-transfer region of the second transfer layer (55), onto side of the non-transfer region. Character collapse referred to herein means a phenomenon in which a transfer receiving region surrounded by or sandwiched between transfer regions represented as characters is transferred due to a phenomenon similar to tailing and thus the original character cannot be reproduced.

The intermediate layer as one example contains, for example, a binder resin such as urethane resins, polyester resins, acryl type resins, vinyl chloride-vinyl acetate copolymer resins, polyvinyl pyrrolidone resins, and polyvinyl alcohol resin, and, as required, inorganic particles such as alumina, silica, titanium oxide, and carbon black. According to the intermediate layer containing inorganic particles in addition to the binder resin, it is possible to make the foil cutting property of the second transfer layer (55) including the intermediate layer better. The intermediate layer of a preferred embodiment contains alumina particulates or silica particulates in addition to the binder resin. Particularly, the intermediate layer of a preferred embodiment contains alumina particulates derived from alumina sol or silica particulates derived from colloidal silica sol in addition to the binder resin. It is also possible to form the intermediate layer from inorganic particulates without using a binder resin.

In the case of focusing on improving the releasability, it is possible to provide an intermediate layer containing a water-based resin on the receiving layer 55A. In other words, it is possible to provide an intermediate layer on the receiving layer 55A by using a coating liquid for intermediate layer prepared by dispersing or dissolving a water-based resin in a water-based solvent. According to the second transfer layer (55) of this embodiment, it is possible to make a further improvement in the releasability. The "water-based resin" referred to herein means a water-soluble resin or a resin which is insoluble in water-based solvents but can be dispersed as an emulsion or dispersion in water-based solvents. As the water-based solvent, water, mixed solvents of water and alcohol may be enumerated.

As the water-soluble resin, polyvinyl pyrrolidone resins, polyvinyl alcohol resins, polyacrylic acid, polyhydroxyethyl acrylate, water-soluble (or water-dispersed) polyester resins, water-soluble (or water-dispersed) polyurethane resins, water-dispersible vinyl chloride resins, water-dispersible acryloyl chloride type resins, water-dispersible epoxy resins, gelatin, hydroxyethyl cellulose resins, hydroxypropyl cellulose resins, and carboxymethyl cellulose may be enumerated There is no particular limitation with respect to the method for forming an intermediate layer, and the intermediate layer can be formed by dissolving or dispersing the binder resin, additive materials to be added as required in an appropriate solvent to prepare a coating liquid for intermediate layer, coating this coating liquid onto the receiving layer 55A, and drying the coated liquid. There is no particular limitation with respect to the thickness of the intermediate layer, and the thickness is preferably 0.01 µm or more and 5 µm or less, particularly preferably 0.02 µm or more and 3 µm or less.

The function layer 54 as another example has a function of improving the adhesion between the first transfer layer (5) and the second transfer layer (55). Hereinafter, the function layer 54 having adhesion is referred to as the adhesive layer. As the adhesive layer, conventionally known ones in the field of the thermal transfer sheet can be appropriately selected and used. The adhesive layer as one example contains an ultraviolet absorbing resin, an acryl type resin, a polyvinyl chloride-vinyl acetate copolymer, an epoxy resin, a polyester resin, a polycarbonate resin, a butyral resin, a polyamide resin, a polyvinyl chloride resin, or the like.

There is no particular limitation with respect to the method for forming the adhesive layer, and the adhesive layer may be formed by dispersing or dissolving the binder resin exemplified as above, an ultraviolet absorbent, an antioxidant, a fluorescent brightener, an inorganic or organic filler component, a surfactant, a release agent, and the like to be added as required in an appropriate solvent to prepare a coating liquid for adhesive layer, coating this coating liquid onto the receiving layer 55A, and drying the coated liquid. There is no particular limitation with respect to the thickness of the adhesive layer, and the thickness is preferably in the range of 0.5 µm or more and 10 µm or less, more preferably in the range of 0.8 µm or more and 2.0 µm or less.

Figure 5:
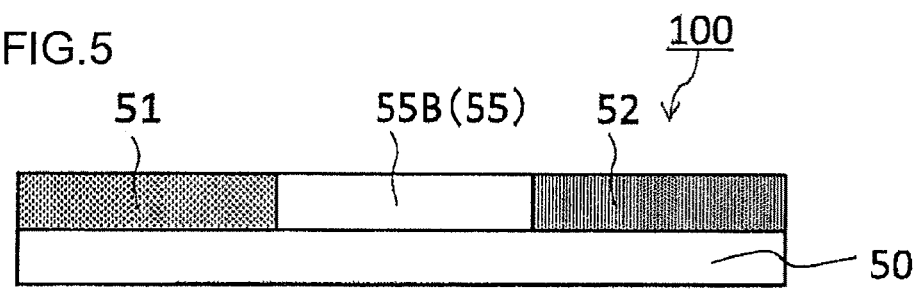
FIG. 5 is a schematic sectional view showing one example of a thermal transfer sheet that is used for a method for forming a print according to one embodiment.

Hereinabove, the embodiment in which the second transfer layer (55) includes the receiving layer has been described with reference to the case where the second image (30) is formed on the second transfer layer (55) by the sublimation-type thermal transfer method as an example. In the case where the second image (30) is formed on the second transfer layer (55) by the thermal melt-type thermal transfer method, the second transfer layer (55) may include no receiving layer, and the second transfer layer (55) may be a heat-seal panel 55B as shown in FIGS. 3 and 5.

The heat-seal panel 55B as the second transfer layer (55) is only required to meet a condition that the heat-seal panel can be released from the substrate 50 by thermal transfer, and is not limited in any way with respect to any other conditions. For example, the heat-seal panel 55B may have a single-layer structure or may have a layered structure. The layer located farthest from the substrate 50 among the layers constituting the heat-seal panel 55B preferably has adhesion to the first transfer layer (5). The second transfer layer (55) also may have a layered structure in which the heat-seal panel 55B and the masking layer 4 are layered in this order from the side of the substrate.

As the heat-seal panel 55B, the protective layer, the exfoliate layer, the adhesive layer and the like as described above can be appropriately selected and used. These layers may be combined.

(Second Colorant Layer)

The second colorant layer (52) is a layer to be used for forming the second image (30) on the second transfer layer (55) transferred on the first transfer layer (5) of the intermediate transfer medium 10 in the second image formation step described below.

For the second colorant layer (52), the various embodiments explained for the first colorant layer (51) described above can be used as they are. Thus, a detailed description is omitted here.

(Dye Primer Layer)

A dye primer layer intended to improve the adhesion between the substrate 50 and the first colorant layer (51) or between the substrate 50 and the second colorant layer (52) may be provided between the substrate 50 and the first colorant layer (51) or the substrate 50 and the second colorant layer (52).

As the dye primer layer, dye primer layers conventionally known in the field of thermal transfer sheets can be appropriately selected and used. The dye primer layer as one example is constituted by a resin material. As the resin material constituting the dye primer layer, resins such as polyester type resins, polyvinyl pyrrolidone resins, polyvinyl alcohol resins, polyacrylic acid ester type resins, polyvinyl acetate type resins, polyurethane type resins, styrene acrylate type resins, polyacrylamide type resins, polyamide type resins, polyvinyl acetoacetal, and polyvinyl butyral may be enumerated. The dye primer layer may also contain additive materials such as organic particles and inorganic particles in addition to these resin components.

There is no particular limitation with respect to the method for forming a dye primer layer, and the dye primer layer can be formed by dissolving or dispersing the resin component exemplified as above and additive materials to be added as required in an appropriate solvent to prepare a coating liquid for dye primer layer, coating this coating liquid onto the substrate 50, and drying the coated liquid. There is no particular limitation with respect to the thickness of the primer layer, and the thickness is usually in the range of 0.02 µm or more and 1 µm or less.

(Release Layer)

A release layer (not shown) may also be provided between the substrate 50 and the second transfer layer (55). The release layer is not a constituent layer of the second transfer layer (55). That is, the release layer remains on the side of the substrate (55) when the second transfer layer (55) is transferred onto the first transfer layer (5). By providing the release layer between the substrate 50 and the second transfer layer (55), it is possible to make an improvement in the transferability of the second transfer layer (55).

As the binder resin contained in the release layer, waxes, silicone waxes, silicone resins, modified silicone resins, fluorine resins, modified fluorine resins, polyvinyl alcohol, acryl resins, thermally cross-linkable epoxy-amino resins, and thermally cross-linkable alkyd-amino resins may be enumerated. The release layer may be formed of one resin or may be formed of two or more resins. The release layer also may be formed by using a cross-linking agent such as an isocyanate compound, a catalyst such as a tin-based catalyst, and an aluminum-based catalyst in addition to the releasable resin. The thickness of the release layer is generally in the range of 0.2 µm or more and 5 µm or less. As the method for forming a release layer, the resin described above is dissolved or dispersed by an appropriate solvent to prepare a coating liquid for release layer, this coating liquid is coated onto the substrate 50, and the coated liquid is dried to thereby enable the release layer to be formed.

(Back Face Layer)

A back face layer (not shown) may be provided on the surface opposite to the surface of the substrate 50 on which the second transfer layer (55) is provided.

There is no limitation with respect to the material of the back face layer, and single resins or mixtures of natural or synthetic resins, for example, cellulose-based resins such as cellulose acetate butyrate and cellulose acetate propionate, vinyl type resins such as polyvinyl butyral and polyvinyl acetal, acryl type resins such as polymethyl methacrylate, polyethyl acrylate, polyacrylamide, and acrylonitrile-styrene copolymers, polyamide resins, polyamide imide resins, polyester type resins, polyurethane resins, and silicone-modified or fluorine-modified urethanes may be enumerated.

The back face layer may also contain a solid or liquid slip agent. As the slip agent, various waxes such as polyethylene wax and paraffin wax, higher aliphatic alcohols, organo polysiloxanes, anionic surfactants, cationic surfactants, amphoteric surfactants, nonionic surfactants, fluorine-based surfactants, organic carboxylic acids and derivatives thereof, metal soaps, fluorine-based resins, silicone-based resins, and fine particles of inorganic compounds such as talc and silica may be enumerated. The mass of the slip agent based on the total mass of the back face layer is in the range of 5% by mass or more and 50% by mass or less, preferably in the range of 10% by mass or more and 40% by mass or less.

There is no particular limitation with respect to the method for forming a back face layer, and the back face layer can be formed by dissolving or dispersing the resin and a slip agent to be added as required in an appropriate solvent to prepare a coating liquid for back face layer, coating this coating liquid onto the substrate 50, and drying the coated liquid. The thickness of the back face layer is preferably in the range of 1 µm or more and 10 µm or less.

Figure 6:
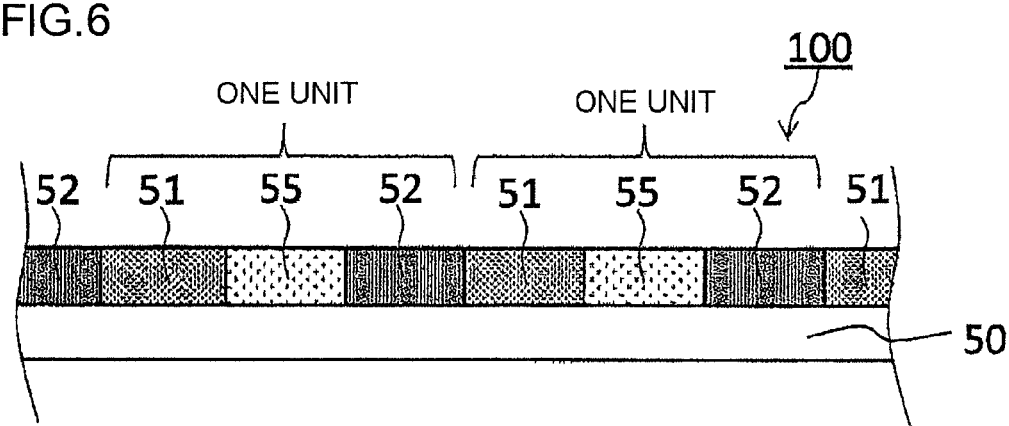
FIG. 6 is a schematic sectional view showing one example of a thermal transfer sheet that is used for a method for forming a print according to one embodiment.

As shown in FIG. 6, when an assembly of the first colorant layer (51), the second transfer layer (55), and the second colorant layer (52) to be provided on one surface of the substrate 50 so as being frame sequentially, is taken as "one unit", this "one unit" may be repeatedly provided side by side on the same surface of the substrate 50. According to the thermal transfer sheet 100 of this embodiment, after the first image (20) and the second image (30) are formed on the first transfer layer (5) of one intermediate transfer medium by means of the "one unit" of the thermal transfer sheet, it is possible to form the first image (20) and the second image (30) on the first transfer layer (5) of another intermediate transfer medium by means of another "one unit" possessed by the same thermal transfer sheet 100. That is, a plurality of prints 300 can be formed by one thermal transfer sheet. The "one unit" means an assembly of colorant layers and a second transfer layer (55) to be used when a print having a stereoscopic image is formed.

Figure 8:
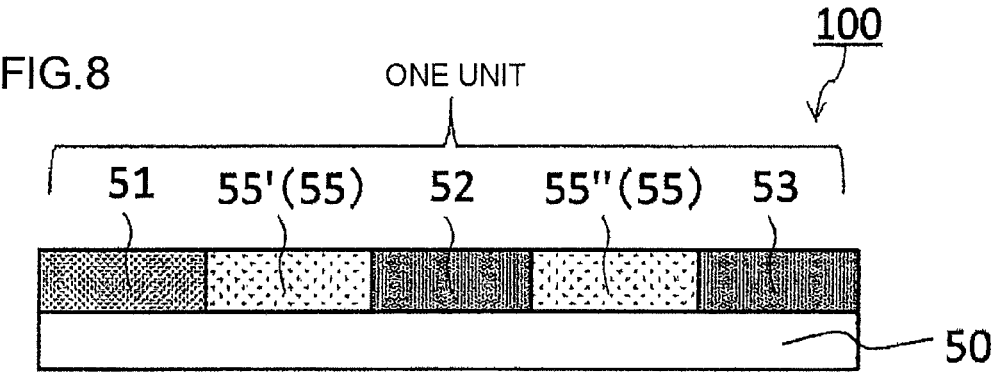
FIG. 8 is a schematic sectional view showing one example of a thermal transfer sheet that is used for a method for forming a print according to one embodiment.

FIGS. 7 and 8 are schematic sectional views showing an example of "one unit". In FIG. 7, the first colorant layer (51) is constitute by a group of a plurality of colorant layers each having a different hue, and the second colorant layer (52) is also constituted by a group of a plurality of colorant layers each having a different hue. Then, the "one unit" is formed by an assembly of the first colorant layer (51) constituted by a plurality of colorant layers, the second transfer layer (55), and the second colorant layer constituted (52) by a plurality of colorant layers. In FIG. 8, on the same surface of the substrate 50, the first colorant layer (51), a second transfer layer (55'), the second colorant layer (52), and a second transfer layer (55"), and a third colorant layer (53) are provided, and an assembly of these forms "one unit". According to the thermal transfer sheet of an embodiment shown in FIG. 8, after the second image (30) is transferred onto the second transfer layer (55'), the second transfer layer (55") located between the second colorant layer (52) and the third colorant layer (53) is transferred onto the second transfer layer (55') on which the second image (30) is formed. Onto this second transfer layer (55"), a third image can be formed using the third colorant layer (53). The "one unit" may also contain a fourth colorant layer, a fifth colorant layer . . . an N−1-th colorant layer, and an N-th colorant layer. In this case, the second transfer layer (55) is located between respective colorant layers.

In the thermal transfer sheet as one example, either one or both layers of the first colorant layer (51) and the second colorant layer (52) constituting the "one unit" is/are a colorant layer(s) containing a sublimable dye or fluorescent dye or a thermally fusible ink layer(s). For example, both the first colorant layer and the second colorant layer may be colorant layer containing a sublimable dye or a fluorescent dye, or both the first colorant layer and the second colorant layer may be thermally fusible ink layers. One layer of the first colorant layer and the second colorant layer may be a colorant layer containing a sublimable dye or a fluorescent dye, and the other layer may be a thermally fusible ink layer. Both the first colorant layer and the second colorant layer may be colorant layers each containing a sublimable dye. Both the first colorant layer and the second colorant layer may be any of a yellow colorant layer, a magenta colorant layer, and a cyan colorant layer. Both the first colorant layer and the second colorant layer may be constituted by two or more layers selected from the group of a yellow colorant layer, a magenta colorant layer, and a cyan colorant layer. For example, a yellow colorant layer and a magenta colorant layer may be arranged to form the first colorant layer, and a magenta colorant layer and a cyan colorant layer may be arranged to form the second colorant layer. The embodiments described above may also be appropriately combined. According to the thermal transfer sheet 100 of one embodiment, it is possible to obtain a stereoscopic image in which the first image (20) to be formed by the first colorant layer (51) and the second image (30) to be formed by the second colorant layer (52) are disposed in the thickness direction with a predetermined interval, in other words, it is possible to separate the first image (20) from the second image (30) by a thickness corresponding to the thickness of the second transfer layer (55). Thereby, even in the case where the colorant component contained in the first image (20) is not compatible with the colorant component contained in the second image (30), it is possible to form a sharp stereoscopic image without occurrence of bleeding or the like in the image. Specifically, also in the case where the first colorant layer (51) containing a sublimable dye is used to form the first image (20) and the second colorant layer (52) containing a fluorescent dye is used to form the second image (30), it is possible to sufficiently exert the color developing property and the like of the second image (30).

The first colorant layer (51), the second colorant layer (52), and other colorant layers other than these may also be hologram transfer layers. As the hologram transfer layers, for example, layers having an uneven pattern (interference fringes) may be used, or layers including a colored hologram such as gold-colored one, silver-colored one or the like colored by metal deposition also may be used. Instead of the masking layer 54 described above, between the second transfer layer (55) and the masking layer 54, or on the masking layer 54, a hologram transfer layer may be located.

<Step of Providing Transfer Receiving Article>

In the second transfer step described below, there is no limitation with respect to a transfer receiving article onto which the transfer foil 60 in which the first transfer layer (5), the first image (20), the second transfer layer (55), and the second image (30) are layered in this order, and plain paper, wood-free paper, tracing paper, plastic films, and plastic cards mainly composed of vinyl chloride, vinyl chloride-vinyl acetate copolymers, and polycarbonate may be enumerated. As the transfer receiving article, one having a predetermined image may be used. By use of a transfer receiving article having transparency as a transfer receiving article 200, either one image or both images of the image formed in the first image formation step and the image formed in the second image formation step can be visually identified from the front face side and the back face side of the print 300 that is finally formed. Particularly, in the case where the second transfer layer (55) of the thermal transfer sheet 100 is a second transfer layer (55) containing the masking layer 54, a transfer receiving article 200 having transparency is preferably used in order to enable an image masked by the masking layer from the side of one surface of the print 300 to be visually identified from the side of the other surface of the print.

Subsequently, the step of forming a print 300 using the intermediate transfer medium 10, the thermal transfer sheet 100, and the transfer receiving article 200 provided above will be specifically described by use of FIGS. 9 to 11. FIG. 9 is a process drawing showing an example of a combination of the intermediate transfer medium 10 in which the first transfer layer (5) including a receiving layer having dye receptivity is provided on the support 1 with the thermal transfer sheet 100 in which the first colorant layer (51) containing a sublimable dye or a fluorescent dye, the second transfer layer (55) including a receiving layer having dye receptivity, and the second colorant layer (52) containing a sublimable dye or a fluorescent dye are provided on one surface of the substrate 50 so as being frame sequentially. FIG. 10 is a process drawing showing an example of a combination of the intermediate transfer medium 10 in which the first transfer layer (5) including a receiving layer having dye receptivity is provided on the support 1 with the thermal transfer sheet 100 in which the first colorant layer (51) containing a sublimable dye or a fluorescent dye, the second transfer layer (55) including a receiving layer 55A having dye receptivity and a masking layer 54 layered, and the second colorant layer (52) containing a sublimable dye or a fluorescent dye are provided on one surface of the substrate 50 so as being frame sequentially. FIG. 11 is a process drawing showing an example of a combination of the intermediate transfer medium 10 in which the first transfer layer (5) including a receiving layer having dye receptivity is provided on the support 1 with the thermal transfer sheet 100 in which the first colorant layer (51) containing a sublimable dye or a fluorescent dye, the second transfer layer (55) constituted by the heat-seal panel 55B, and the second colorant layer (52) as a thermally fusible ink layer are provided on one surface of the substrate 50 so as being frame sequentially.

<First Image Formation Step>

Figure 9A:
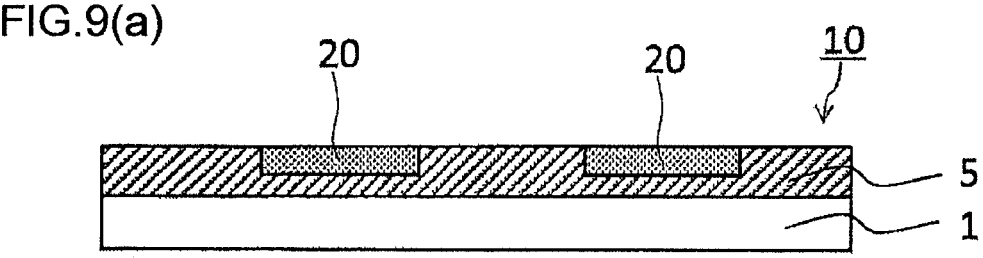
FIGS. 9(a) to 9(d) are each a schematic sectional view in a process drawing for explaining the method for forming a print according to one embodiment.
Figure 9B:
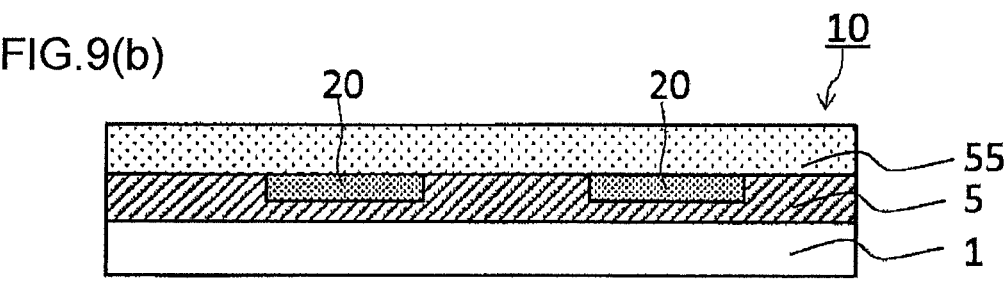
Figure 9C:
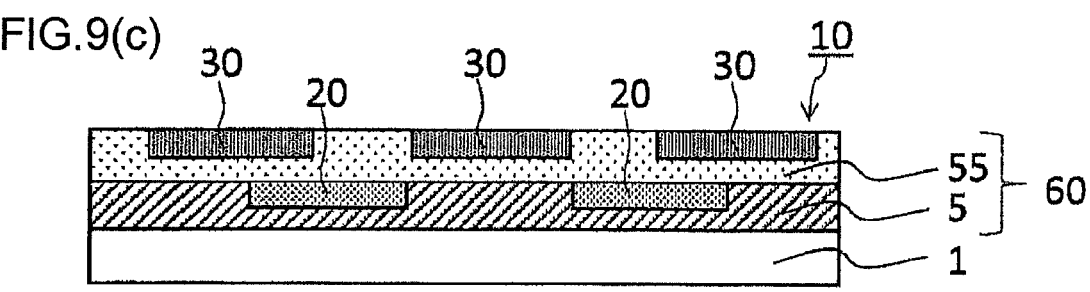
Figure 9D:
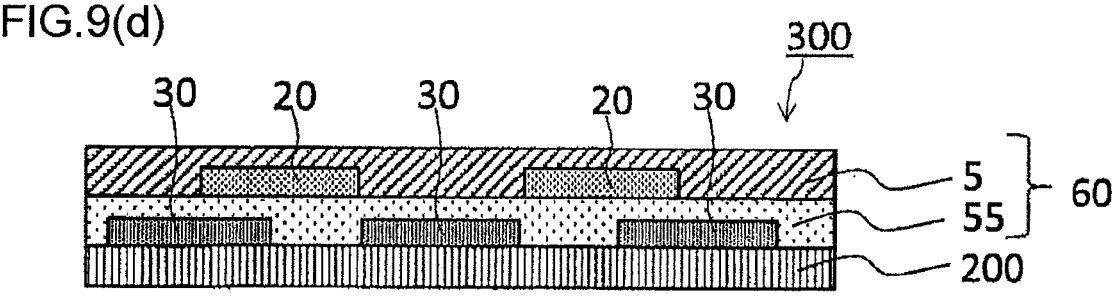
Figure 11A:
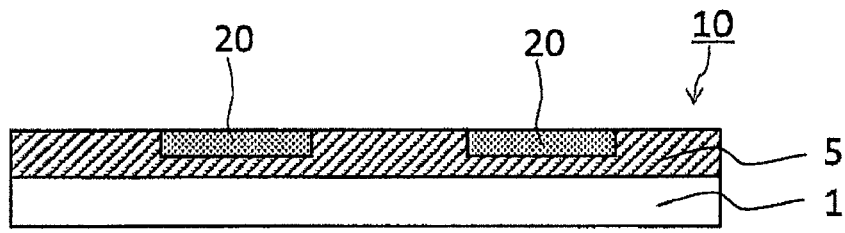
FIGS. 11(a) to 11(d) are each a schematic sectional view in a process drawing for explaining the method for forming a print according to one embodiment.

This step is a step of superposing the intermediate transfer medium 10 and the thermal transfer sheet 100 provided as above such that the first transfer layer (5) of the intermediate transfer medium 10 and the first colorant layer (51) of the thermal transfer sheet 100 face to each other to thereby form a first image (20) on the first transfer layer (5) using a heating device such as a thermal head or the like, as shown in FIGS. 9(a), 10(a), and 11(a). In FIGS. 9 to 11, the first image (20) is formed by transferring the dye contained in the first colorant layer (51) onto the first transfer layer (5) by the sublimation-type thermal transfer method. As described above, it is also possible to form the first image (20) by melt-transferring the first colorant layer (51) onto the first transfer layer (5) using a heat-seal panel as the first transfer layer (5) and a thermally fusible ink layer as the first colorant layer (51) by means of the thermal melt-type thermal transfer method.

<First Transfer Step>

Figure 11B:
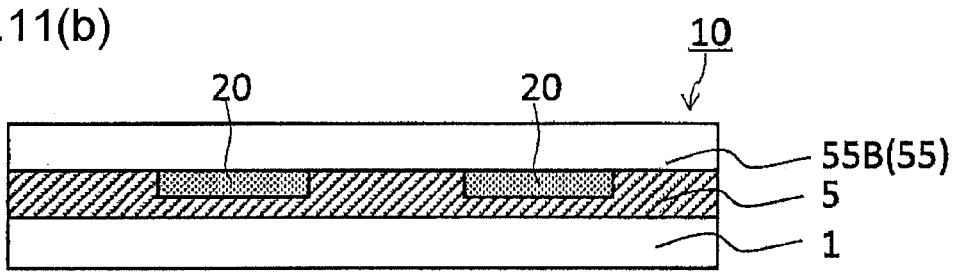

This step is a step of superposing the first transfer layer (5) of the intermediate transfer medium 10 (the first transfer layer (5) on which the first image (20) has been formed) and the second transfer layer (55) of the thermal transfer sheet 100 so as to face to each other, after the first image formation step described above, to thereby transfer the second transfer layer (55) onto the first transfer layer (5) on which the first image (20) has been formed using a heating device such as a thermal head or the like, as shown in FIGS. 9(b), 10(b), and 11(b). In the embodiment shown in FIG. 10B, the second transfer layer (55) in which the receiving layer (55A) and the masking layer 54 are layered in this order from the side of the substrate 50 is transferred onto the first transfer layer (5) on which the first image (20) has been formed. In the embodiment shown in FIG. 11(b), the second transfer layer (55) constituted by a heat-seal panel is transferred onto the first transfer layer (5) on which the first image (20) has been formed. There is no particular limitation with respect to the method for transferring the second transfer layer (55), and in addition to methods in which a heating device such as a thermal head or the like is used, for example, the hot stamping method, the heat roll method, or the like may be employed. The second transfer layer (55) may be transferred also by methods other than these. The same applies to the case where the transfer foil 60 is transferred onto the transfer receiving article 200 in the second transfer step.

<Second Image Formation Step>

Figure 11C:
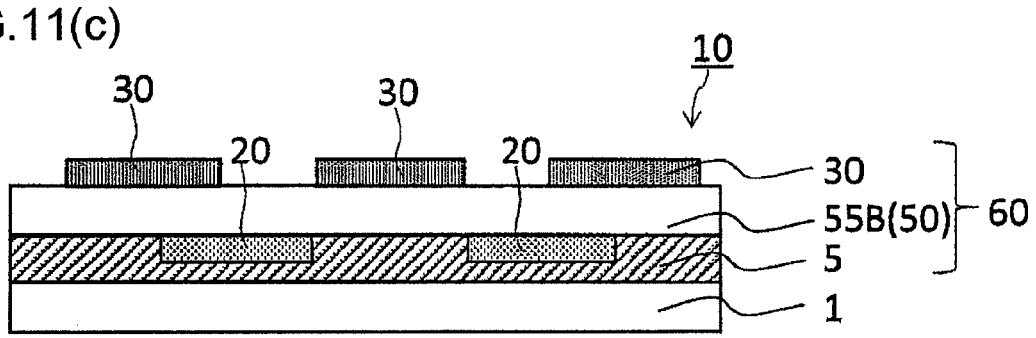
Figure 11D:
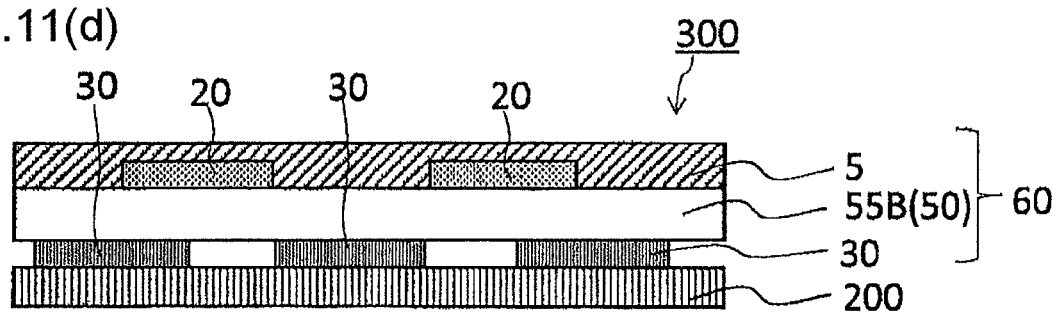

This step is a step of superposing the second transfer layer (55) transferred on the first transfer layer (5) of the intermediate transfer medium 10 and the second colorant layer (52) of the thermal transfer sheet 100 so as to face to each other, after the second transfer step described above, to thereby form the second image (30) on the second transfer layer (55) using a heating device such as a thermal head or the like, as shown in FIGS. 9(c), 10(c), and 11(c). In the embodiments shown in FIGS. 9 and 10, allowing the dye contained in second colorant layer (52) to migrate onto the second transfer layer (55) by the sublimation-type thermal transfer method has formed the second image (30). In the embodiment shown in FIG. 11, melt-transferring the second colorant layer (52) as the thermally fusible ink layer onto the second transfer layer (55) as the heat-seal panel 55B by the thermal melt-type thermal transfer method has formed the second image (30).

An intermediate transfer medium 10 in which the first transfer layer (5), the first image (20), the second transfer layer (55), and the second image (30) are layered in this order on the support 1 of the intermediate transfer medium 10 is obtained by undergoing the first image formation step, the first transfer step, and the second image formation step described above. Hereinafter, the laminate of the first transfer layer (5), the first image (20), the second transfer layer (55), and the second image (30) is referred to as a transfer foil 60.

There is no particular limitation with respect to the position at which the second image (30) is formed. The second image (30) may be formed in a position at which the second image (30) overlays a portion or the whole of the first image (20) in the thickness direction, or may be formed in a position at which the second image (30) does not overlay a portion or the whole of the first image (20) in the thickness direction (in the embodiments shown in FIGS. 9C, 10C, and 11C, a portion of the first image (20) overlaps the second image (30) in the thickness direction). Formation of the second image (30) at a position at which the second image (30) overlaps a portion or the whole of the first image (20) in the thickness direction can make an improvement in the apparent concentration of the thermally transferable image in the area at which the first image (20) overlaps the second image (30) in the thickness direction.

<Second Transfer Step>

This step is a step of superposing the transfer receiving article 200 provided above and the intermediate transfer medium 10 on which the second image (30) has been formed such that the transfer receiving article 200 and the transfer foil 60 of the intermediate transfer medium 10 face to each other to thereby transfer the transfer foil 60 onto the transfer receiving article 200. In other words, it is a step of transferring the first transfer layer (5) of the intermediate transfer medium 10 together with the second transfer layer (55) transferred on the first transfer layer (5) onto the transfer receiving article 200. A print 300 having a stereoscopic image in which the first image (20) and the second image (30) are disposed in the thickness direction with a predetermined interval on the transfer receiving article 200 is obtained by undergoing the second transfer step. In the print 300 formed by the embodiment shown in FIG. 10, the masking layer 54 is located between the first image (20) and the second image (30), and the second image (30) is masked by the masking layer 54 when the print 300 is viewed from the side of the first transfer layer (5).

Hereinabove, the method for forming a print of one embodiment has been described using FIGS. 9 to 11. The method for forming a print of the present invention is characterized by capable of forming a print in which a plurality of images is disposed in the thickness direction with a predetermined interval using a thermal transfer sheet and one intermediate transfer medium, that is, a print having a stereoscopic image. The method is only required to meet conditions that the intermediate transfer medium includes a first transfer layer that can be transferred onto an transfer receiving article, the thermal transfer sheet is a thermal transfer sheet according to the forms of (i) to (iii) described above, that is, a thermal transfer sheet having a first colorant layer for forming a first image on the first transfer layer of the intermediate transfer medium, a second transfer layer, and a second colorant layer for forming a second image on the second transfer layer. The method is not limited in any way with respect to any other conditions.

Accordingly, the method for forming a print of the present invention is not limited to the embodiments illustrated, and various modifications may be made without departing from the scope of the present invention. For example, it is also possible to obtain a print 300 having another image together with the first image (20) and the second image (30) by using the thermal transfer sheet of the embodiment shown in FIG. 8 as the thermal transfer sheet 100. It is also possible to form a print 300 by appropriately combining the intermediate transfer medium 10 described above with the thermal transfer sheet 100 described above. The first colorant layer or the second colorant layer containing a sublimable dye or a fluorescent dye or the first colorant layer or the second colorant layer as the thermally fusible ink layer may be replaced by a colorant layer containing a colorant component other than these.

<<Method for Forming Print of Another Embodiment>>

Next, a method for forming a print according to another embodiment of the present disclosure (hereinafter, it is referred to as a method for forming a print of another embodiment) will be described. The method for forming a print of another embodiment is characterized in that the method includes a step of providing an intermediate transfer medium 10 in which, on one surface of a support 1, a first transfer layer (5) is provided releasably from the support 1 (see FIGS. 1 and 2), a step of providing a thermal transfer sheet 100, and a step of providing a transfer receiving article 200, the thermal transfer sheet 100 has a first colorant layer (51), a second colorant layer (52) including a masking layer 54, and a second transfer layer (55), and is any of (i) a combination of a thermal transfer sheet in which the first colorant layer (51) is provided on a substrate 50 and a thermal transfer sheet in which the second colorant layer (52) is provided on a substrate 50, (ii) a combination of thermal transfer sheet in which any one of the first colorant layer (51), the second colorant layer (52), and the second transfer layer (55) is provided on a substrate 50 and a thermal transfer sheet in which the other two layers are provided on a substrate 50 so as being frame sequentially, and (iii) a thermal transfer sheet in which the first colorant layer (51), the second colorant layer (52), and the second transfer layer (55) are provided on a substrate 50 so as being frame sequentially (see FIG. 8), and the method also includes a first image formation step of combining the intermediate transfer medium 10 with the thermal transfer sheet 100 to transfer a first image (20) onto a portion of the first transfer layer (5) of the intermediate transfer medium 10 using the first colorant layer (51) of the thermal transfer sheet 100 (see FIG. 12(a)), a first transfer step of transferring the second transfer layer (55) of the thermal transfer sheet 100 onto the first image (20) so as to expose at least a portion of a region on which the first image (20) of the first transfer layer (5) is not formed (see FIG. 12(b)), a second image formation step of forming a second image (30) on the exposed first transfer layer (5) using the second colorant layer (52) of the thermal transfer sheet 100 (see FIG. 12(c)), and a second transfer step of transferring the first transfer layer (5) of the intermediate transfer medium together with the second transfer layer (55) transferred on the first transfer layer (5) onto a transfer receiving article 200 (see FIG. 12(d)).

The method for forming a print of one embodiment described forms the second image (30) on the second transfer layer (55) transferred on the first transfer layer (5), whereas the method for forming a print of another embodiment forms the first image (20) and the second image (30) on the first transfer layer (5) and transfers the second transfer layer (55) including the masking layer 54 onto the first image (20). This is the only difference between the method for forming a print of one embodiment and the method for forming a print of another embodiment, and the methods are the same except for this difference. Hereinafter, the method for forming a print of another embodiment will be described with focusing on the difference from the method for forming a print of one embodiment.

<Step of Providing Intermediate Transfer Medium>

As the intermediate transfer medium provided in this step, the intermediate transfer medium 10 described for the method for forming a print of one embodiment described above can be appropriately selected and used.

<Step of Providing Thermal Transfer Sheet>

As the thermal transfer sheet to be provided in this step, the thermal transfer sheet 100 described for the method for forming a print of one embodiment described above can be appropriately selected and used, except for an essential condition that the second transfer layer (55) includes the masking layer 54.

The second transfer layer (55) may have a single-layer structure constituted singly by the masking layer 54 or may have a layered structure including the masking layer 54. For example, in the case where another image is formed on the second transfer layer (55) using the sublimation-type thermal transfer method, the second transfer layer (55) may have a layered structure in which the receiving layer 55A and the masking layer 54 are layered in this order from the side of the substrate 50. The second transfer layer (55) may have a structure other than this including the masking layer 54. The second transfer layer (55) including the masking layer 54 is transferred onto the first image (20) to serve to mask the first image (20) when the print to be finally formed is visually identified from the side of one surface.

<First Image Formation Step>

Figure 12A:
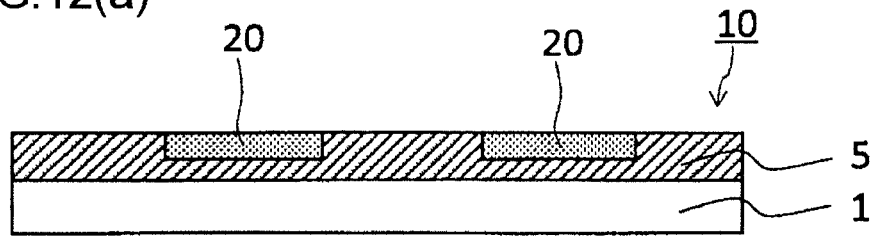
FIGS. 12(a) to 12(d) are each a schematic sectional view in a process drawing for explaining the method for forming a print according to one embodiment.

The first image formation step of another embodiment is a step of combining the intermediate transfer medium 10 and the thermal transfer sheet 100 provided above to form the first image (20) on the first transfer layer (5) of the intermediate transfer medium 10 using the first colorant layer (51) of the thermal transfer sheet 100, as shown in FIG. 12(a). In other words, it is a step of forming the first image (20) not on the whole but a portion of the first transfer layer (5).

<First Transfer Step>

Figure 12B:
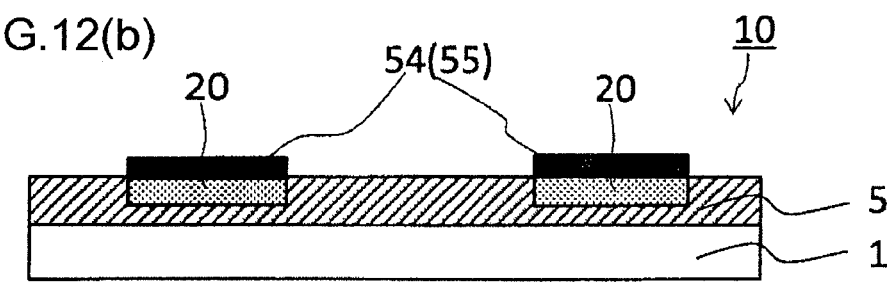

The first transfer step of another embodiment is a step of transferring the second transfer layer (55) including the masking layer 54 onto the first image (20) so as to expose at least a portion of a region on which the first image (20) of the first transfer layer (5) is not formed, as shown in FIG. 12(b). The second transfer layer (55) may be transferred so as to cover the whole surface of the first image (20) or a portion of the surface of the first transfer layer (5), may be transferred so as to cover only the whole surface of the first image (20), or may be transferred so as to cover a portion of the first image (20) (in the embodiment shown, the second transfer layer (55) is transferred in the same shape as the first image (20)).

<Second Image Formation Step>

Figure 12C:
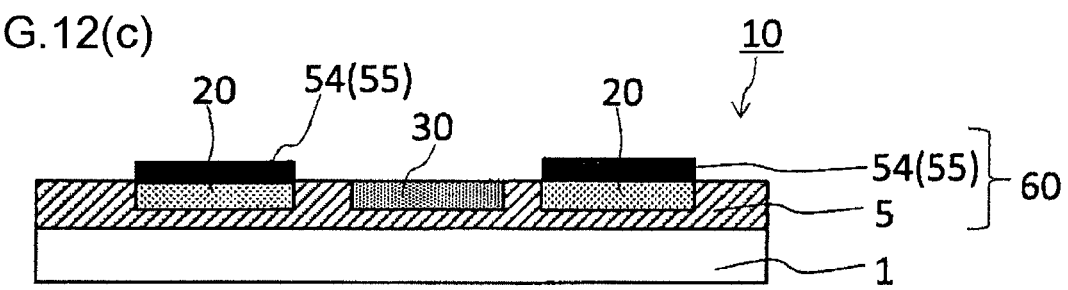

The second image formation step of another embodiment is a step of forming the second image (30) on the first transfer layer (5) exposed as shown in FIG. 12(c) using the second colorant layer (52) of the thermal transfer sheet 100. The second image (20) can be formed also on the exposed first transfer layer (5) described above and on the second transfer layer (55).

The second image formation step may be carried out also before the first image formation step or the first transfer step described above. Specifically, after the first image (20) is formed on the first transfer layer (50) and then the second image (30) is formed on a region of the first transfer layer (50) on which the first image (20) is not formed, the second transfer layer (55) may be transferred onto the first image (20). Alternatively, after the second image (30) is formed on the first transfer layer (50), the first image formation step and first transfer step may be carried out.

<Second Transfer Step>

Figure 12D:
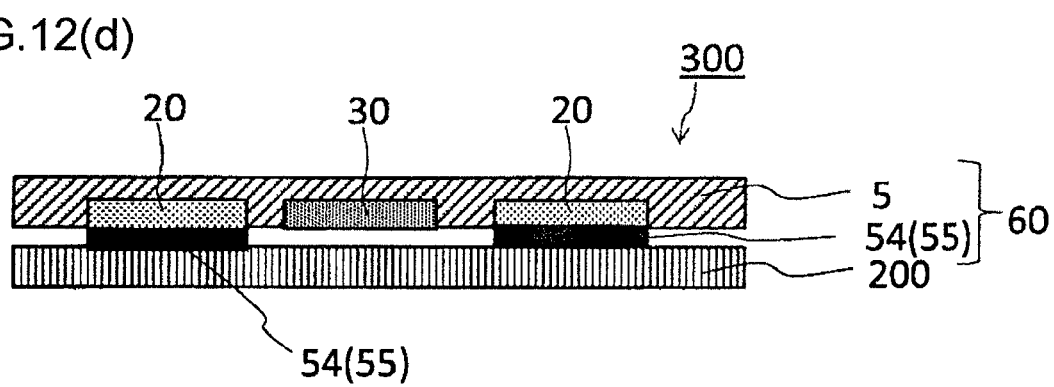

The second transfer step of another embodiment is a step of transferring the first transfer layer (5) of the intermediate transfer medium together with the second transfer layer (55) of the first transfer layer (5) onto the transfer receiving article 200, as shown in FIG. 12(d). Specifically, it is a step of transferring the transfer foil 60, in which the first transfer layer on the surface of which the first image (20) and the second image (30) are formed and the second transfer layer (55) transferred on the first image (20) are layered, onto the transfer receiving article 200. A print 300 in which the first image (20) and the second image (30) are included and the first image (20) is masked by the second transfer layer (55) including the masking layer 54 is obtained by undergoing the second transfer step.

According to the method for forming a print of another embodiment described hereinabove, it is possible to obtain the print 300 in which the first image (20) and the second image (30) are included and the first image (20) is masked by the second transfer layer (55) including the masking layer 54, the print 300 having high designability. The first image (20) and the second image (30) may be images formed by either of the sublimation-type thermal transfer method or the thermal melt-type thermal transfer method. The method for forming a print of another embodiment also may be appropriately combined with a constituent(s) described for the method for forming a print of one embodiment described above.

<<Thermal Transfer Sheet>>

Subsequently, the thermal transfer sheet according to the embodiment of the present disclosure (hereinafter, it is referred to as the thermal transfer sheet of one embodiment) will be described. The thermal transfer sheet 100 of one embodiment is a thermal transfer sheet including colorant layers, characterized in that the first colorant layer (51), the transfer layer (55), and the second colorant layer (52) are provided on one surface of the substrate so as being frame sequentially, the transfer layer (55) is provided releasably from the substrate 50, and when an assembly of the first colorant layer (51), the transfer layer (55), and the second colorant layer (52) is taken as one unit, a plurality of the unit is repeatedly provided side by side on the same surface of the substrate 50, as shown in FIGS. 6 to 8.

According to the thermal transfer sheet of one embodiment having this feature, it is possible to form a print having a stereoscopic image by combining the sheet with one intermediate transfer medium.

As the thermal transfer sheet 100 of one embodiment, the thermal transfer sheet 100 described for the method for forming a print described above may be appropriately selected and used, and detailed description is omitted here.

<<Combination of Thermal Transfer Sheet with Intermediate Transfer Medium>>

Subsequently, a combination of a thermal transfer sheet with an intermediate transfer medium according to the embodiment of the present disclosure (hereinafter, it is referred to as the combination of one embodiment) will be described.

The combination of one embodiment is characterized in that the thermal transfer sheet of the combination is the thermal transfer sheet of one embodiment described above or the thermal transfer sheet described for the method for forming a print of one embodiment described above, and that the intermediate transfer medium is the intermediate transfer medium described for the method for forming a print of one embodiment described above.

According to the combination of one embodiment having this feature, it is possible to form a print having a stereoscopic image.

Examples (Formation of Intermediate Transfer Medium 1)

Using a polyethylene terephthalate film of having a thickness of 16 μm as a support, a coating liquid for exfoliate layer having the following composition was coated onto the support so as to obtain a thickness of 1 μm in dried state, and then the coated liquid was dried, thereby an exfoliate layer was formed. Subsequently, a coating liquid for protective layer having the following composition was coated onto the exfoliate layer so as to obtain a thickness of 2 μm in dried state, and then the coated liquid was dried, thereby a protective layer was formed. Additionally, a coating liquid for receiving layer A having the following composition was coated onto the protective layer so as to obtain a thickness of 1.5 μm in dried state, and then the coated liquid was dried, thereby a receiving layer was formed. Thus, an intermediate transfer medium 1 was obtained in which a first transfer layer including the exfoliate layer, the protective layer, and the receiving layer layered in this order was provided on the support.

<Coating Liquid for Exfoliate Layer>

| | |
|---|---|
| Acryl resin | 29 parts |
| (Dianal(R) BR-87, Mitsubishi Rayon Co., Ltd.) | |
| Polyester resin | 1 part |
| (Vylon(R) 200, TOYOBO CO., LTD.) | |
| Methyl ethyl ketone | 35 parts |
| Toluene | 35 parts |

<Coating Liquid for Protective Layer>

| | |
|---|---|
| Polyester resin | 30 parts |
| (Vylon 200, TOYOBO CO., LTD.) | |
| Methyl ethyl ketone | 35 parts |
| Toluene | 35 parts |

<Coating Liquid for Receiving Layer A>

| | |
|---|---|
| Polyvinyl chloride - vinyl acetate copolymer | 20 parts |
| (SOLBIN(R) CML, Nissin Chemical Co., Ltd.) | |
| Silicone oil | 1 part |
| (X-22-3000T, Shin-Etsu Chemical Co., Ltd.) | |
| Methyl ethyl ketone | 79 parts |

(Formation of Thermal Transfer Sheet 1)

Using a polyethylene terephthalate film including an plain-adhesive layer and having a thickness of 5.0 μm as a substrate, a coating liquid for sublimable fluorescent colorant layer 1 having the following composition was coated onto the side of the easy-adhesive layer of this substrate so as to obtain a thickness of 0.5 μm in dried state, and then the coated liquid was dried, thereby a first colorant layer (1) constituted singly by a sublimable fluorescent colorant layer was formed.

<Coating Liquid for Sublimable Fluorescent Colorant Layer 1>

| | |
|---|---|
| Fluorescent whitening agent | 2 parts |
| (Uvitex(R) OB, BASF) | |
| Polyvinyl acetoacetal resin | 4 parts |
| (S-LEC(R) KS-5, SEKISUI CHEMICAL CO., LTD.) | |
| Toluene | 50 parts |
| Methyl ethyl ketone | 50 parts |

Then, a coating liquid for release layer having the following composition was coated onto the side of the easy-adhesive layer of the substrate described above so as to obtain a thickness of 0.2 µm in dried state, and then the coated liquid was dried, thereby a release layer was formed. Subsequently, a coating liquid for receiving layer 1 having the following composition was coated onto the release layer so as to obtain the thickness of 1 µm in dried state, and the coated liquid was dried, thereby a receiving layer was formed. Subsequently, a coating liquid for intermediate layer having the following composition was coated onto the receiving layer so as to obtain a thickness of 0.15 µm in dried state, and then the coated liquid was dried, thereby an intermediate layer was formed. A coating liquid for heat seal layer 1 was coated onto this intermediate layer so as to obtain the thickness of 2 µm in dried state, and then the coated liquid was dried, thereby a heat seal layer was formed. Thus, a second transfer layer (1) in which the receiving layer, the intermediate layer, and the heat seal layer were layered in this order together with the first colorant layer (1) described above were formed on the release layer provided on one surface of the substrate so as being frame sequentially.

<Coating Liquid for Release Layer>

| | |
|---|---|
| Urethane type resin | 25 parts |
| Polyvinyl acetal resin | 75 parts |
| (S-LEC(R) KS-5, SEKISUI CHEMICAL CO., LTD.) | |
| Toluene | 950 parts |
| Isopropyl alcohol | 950 parts |

<Coating Liquid for Receiving Layer 1>

| | |
|---|---|
| Polyvinyl chloride - vinyl acetate copolymer | 16.8 parts |
| (SOLBIN(R) CNL, Nissin Chemical Co., Ltd.) | |
| Silicone oil | 1.2 parts |
| (X-22-3000T, Shin-Etsu Chemical Co., Ltd.) | |
| Silicone oil | 1.2 parts |
| (X-24-510, Shin-Etsu Chemical Co., Ltd.) | |
| Silicone oil | 0.8 parts |
| (KF-352A, Shin-Etsu Chemical Co., Ltd.) | |
| Methyl ethyl ketone | 40 parts |
| Toluene | 40 parts |

<Coating Liquid for Intermediate Layer>

| | |
|---|---|
| Colloidal alumina (solid content 10.5%) | 3.5 parts |
| (Alumina sol 200, Nissan Chemical Industries, Ltd.) | |
| vinyl acetate-polyvinyl pyrrolidone copolymer | 1.5 parts |
| (PVP/VA E-335, ISP Japan Ltd.) | |
| Water | 47.5 parts |
| Isopropyl alcohol | 47.5 parts |

<Coating Liquid for Heat Seal Layer 1>

| | |
|---|---|
| Acryl type resin | 16 parts |
| (Dianal(R) BR-87, Mitsubishi Rayon Co., Ltd.) | |
| Polyvinyl chloride - vinyl acetate copolymer | 4 parts |
| (SOLBIN(R) CNL, Nissin Chemical Co., Ltd.) | |
| Methyl ethyl ketone | 40 parts |
| Toluene | 40 parts |

Subsequently, a coating liquid for yellow colorant layer, a coating liquid for magenta colorant layer, and a coating liquid for cyan colorant layer having the following compositions were coated onto the side of the easy-adhesive layer of the substrate described above so as to each obtain a thickness of 0.5 µm in dried state, and then the coated liquids were dried, thereby a second colorant layer (1) on which a yellow colorant layer, a magenta colorant layer, and a cyan colorant layer were provided in this order so as being frame sequentially together with the first colorant layer (1) and the second transfer layer (1) were formed so as being frame sequentially.

<Coating Layer for Yellow Colorant Layer>

| | |
|---|---|
| Solvent yellow 93 | 5 parts |
| Polyvinyl acetoacetal resin | 4 parts |
| (S-LEC(R) KS-5, SEKISUI CHEMICAL CO., LTD.) | |
| Toluene | 50 parts |
| Methyl ethyl ketone | 50 parts |

<Coating Liquid for Magenta Colorant Layer>

| | |
|---|---|
| Disperse Red 60 | 3 parts |
| Disperse Violet 26 | 3 parts |
| Polyvinyl acetoacetal resin | 5 parts |
| (S-LEC(R) KS-5, SEKISUI CHEMICAL CO., LTD.) | |
| Toluene | 50 parts |
| Methyl ethyl ketone | 50 parts |

<Coating Liquid for Cyan Colorant Layer>

| | |
|---|---|
| Solvent blue 63 | 3 parts |
| Disperse Blue 354 | 2.5 parts |
| Polyvinyl acetoacetal resin | 5 parts |
| (S-LEC(R) KS-5, SEKISUI CHEMICAL CO., LTD.) | |
| Toluene | 50 parts |
| Methyl ethyl ketone | 50 parts |

Additionally, a coating liquid for back face layer having the following composition was coated onto the surface opposite to the easy-adhesive layer of the substrate so as to obtain a thickness of 1 µm in dried state, and then the coated liquid was dried, thereby a back face layer was formed. Thus, a thermal transfer sheet (1) was formed, wherein the first colorant layer (1), the second transfer layer (1), and the second colorant layer (1) were provided in this order on one surface, on the side of the easy-adhesive layer, of the substrate so as being frame sequentially, and the back face layer was provided on the other surface of the substrate.

<Coating Liquid for Back Face Layer>

| | |
|---|---|
| Polyvinyl butyral resin (S-LEC (R) BX-1, SEKISUI CHEMICAL CO., LTD.) | 1.8 parts |
| Polyisocyanate (BURNOCK (R) D750, DIC Corporation) | 5.5 parts |
| Phosphoric acid ester-based surfactant (PLYSURF (R) A208N, DKS Co. Ltd.) | 1.6 parts |
| Talc (MICRO ACE (R) P-3, NIPPON TALC Co., Ltd.) | 0.35 parts |
| Toluene | 18.5 parts |
| Methyl ethyl ketone | 18.5 parts |

(Formation of Thermal Transfer Sheet 2)

The same procedure as described for the thermal transfer sheet 1 was repeated, except that the coating layer for release layer having the composition described above was coated onto the side of the easy-adhesive layer of the substrate so as to obtain a thickness of 0.2 μm in dried state, the coated liquid was dried, and then a release layer was formed, and subsequently, a coating layer for melt-transfer layer 1 having the following composition was coated onto the release layer so as to obtain a thickness of 1 μm in dried state, the coated liquid was dried, and then a thermal-melting fluorescent layer was formed to thereby form a first colorant layer (2) constituted singly by the thermal-melting fluorescent layer on the release layer, instead of the method for forming the first colorant layer (1) of the thermal transfer sheet 1, to thereby form a thermal transfer sheet 2 in which the first colorant layer (2), the second transfer layer (1), and the second colorant layer (1) were provided in this order on one surface, on the side of the easy-adhesive layer, of the substrate so as being frame sequentially, and the back face layer was provided on the side of the other surface of the substrate.

<Coating Layer for Melt-Transfer Layer 1 (Coating Liquid for Thermal-Melting Fluorescent Transfer Layer)>

| | |
|---|---|
| Fluorescent whitening agent (Uvitex(R) OB, BASF) | 0.5 parts |
| Polyvinyl chloride - vinyl acetate copolymer (SOLBIN(R) CNL, Nissin Chemical Co., Ltd.) | 9.5 parts |
| Toluene | 50 parts |
| Methyl ethyl ketone | 50 parts |

(Formation of Thermal Transfer Sheet 3)

The same procedure as described for the thermal transfer sheet 1 was repeated, except that the coating layer for release layer having the composition described above was coated onto the side of the easy-adhesive layer of the substrate so as to obtain a thickness of 0.2 μm in dried state, the coated liquid was dried, and then a release layer was formed, and subsequently, a coating layer for melt-transfer layer 1 having the following composition was coated onto the release layer so as to obtain a thickness of 1 μm in dried state, the coated liquid was dried, and then a thermal-melting pigment layer was formed to thereby form a first colorant layer (2) constituted singly by the thermal-melting pigment layer on the release layer, instead of the method for forming the first colorant layer (1) of the thermal transfer sheet 1, to thereby form a thermal transfer sheet 3 in which the first colorant layer (2), the second transfer layer (1), and the second colorant layer (1) were provided in this order on one surface, on the side of the easy-adhesive layer, of the substrate so as being frame sequentially, and the back face layer was provided on the side of the other surface of the substrate.

<Coating Layer for Melt-Transfer Layer 2 (Coating Layer for Thermal-Melting Pigment Transfer Layer)>

| | |
|---|---|
| Disperse Yellow 54 | 4 parts |
| Polyvinyl chloride - vinyl acetate copolymer (SOLBIN(R) CML, Nissin Chemical Co., Ltd.) | 6 parts |
| Toluene | 50 parts |
| Methyl ethyl ketone | 50 parts |

(Formation of Thermal Transfer Sheet 4)

The same procedure as described for the thermal transfer sheet 1 was repeated, except that the first colorant layer (1) was replaced by the first colorant layer (2) described above, the second colorant layer (1) was replaced by a second colorant layer (2) having the same constituents as those of the first colorant layer (3) described above, and the coating layer for release layer having the composition described above was coated onto the side of the easy-adhesive layer of the substrate so as to obtain a thickness of 0.2 μm in dried state, the coated liquid was dried, and then a release layer was formed, and subsequently, a coating liquid for heat seal layer 2 having the following composition was coated onto the release layer so as to obtain a thickness of 1 μm in dried state, the coated liquid was dried, and then a second transfer layer (2) constituted only by the heat seal layer on the release layer, instead of the method for forming the second transfer layer (1), to thereby form a thermal transfer sheet 4 in which the first colorant layer (2), the second transfer layer (2), and the second colorant layer (2) were provided in this order on one surface, on the side of the easy-adhesive layer, of the substrate so as being frame sequentially, and the back face layer was provided on the side of the other surface of the substrate.

<Coating Liquid for Heat Seal Layer 2>

| | |
|---|---|
| Polyvinyl chloride - vinyl acetate copolymer (SOLBIN(R) CNL, Nissin Chemical Co., Ltd.) | 20 parts |
| Methyl ethyl ketone | 40 parts |
| Toluene | 40 parts |

(Formation of Thermal Transfer Sheet 5)

The coating layer for release layer having the composition described above was coated onto the side of the easy-adhesive layer of the substrate so as to obtain the thickness of 0.2 μm in dried state, and then the coated liquid was dried, thereby a release layer was formed, instead of the method for forming the second transfer layer (1) of the thermal transfer sheet 1. Subsequently, a coating layer for receiving layer 2 having the following composition was coated onto the release layer so as to obtain the thickness of 1 μm in dried state, and then the coated liquid was dried, thereby a receiving layer was formed. Then, the coating layer for intermediate layer having the composition described above was coated onto the receiving layer so as to obtain a thickness of 0.15 μm in dried state, and then the coated liquid was dried, thereby an intermediate layer was formed. Then, the same procedure as described for the thermal transfer sheet 1 was repeated, except that the coating liquid for heat seal layer 1 having the composition described above was coated onto the intermediate layer so as to obtain a thickness of 2 μm in dried state, the coated liquid was dried, and then a heat seal layer was formed to form a second transfer layer (3) in which the receiving layer, the intermediate layer, and the heat seal layer are layered in this order on the release layer formed on one surface of the substrate, thereby forming a thermal transfer sheet 5 in which the first colorant layer (1), the second transfer layer (3), and the second colorant layer (1) are provided in this order on one surface, on the side of the easy-adhesive layer, of the substrate so as being frame sequentially, and the back face layer was provided on the side of the other surface of the substrate.

<Coating Liquid for Receiving Layer 2>

| | |
|---|---|
| Polyvinyl chloride - vinyl acetate copolymer (SOLBIN(R) CNL, Nissin Chemical Co., Ltd.) | 15.8 parts |
| Cellulose acetate butyrate resin (Mn:30000) (CAB381-0.5, Eastman Chemical Company) | 1.0 part |
| Silicone oil (X-22-30001, Shin-Etsu Chemical Co., Ltd.) | 1.2 parts |
| Silicone oil (X-24-510, Shin-Etsu Chemical Co., Ltd.) | 1.2 parts |
| Silicone oil (KF-352A, Shin-Etsu Chemical Co., Ltd.) | 0.8 parts |
| Methyl ethyl ketone | 40 parts |
| Toluene | 40 parts |

(Formation of Thermal Transfer Sheet 6)

The coating layer for release layer having the composition described above was coated onto the side of the easy-adhesive layer of the substrate so as to obtain the thickness of 0.2 μm in dried state, and then the coated liquid was dried, thereby a release layer was formed, instead of the method for forming the second transfer layer (1) of the thermal transfer sheet 1. Subsequently, a coating layer for receiving layer 2 having the composition described above was coated onto the release layer so as to obtain the thickness of 1 μm in dried state, and then the coated liquid was dried, thereby a receiving layer was formed. Then, the coating layer for intermediate layer having the composition described above was coated onto the receiving layer so as to obtain a thickness of 0.15 μm in dried state, and then the coated liquid was dried, thereby an intermediate layer was formed. Then, the same procedure as described for the thermal transfer sheet 1 was repeated, except that a coating liquid for heat seal layer 3 having the following composition was coated onto the intermediate layer so as to obtain a thickness of 2 μm in dried state, the coated liquid was dried, and then a heat seal layer was formed to form a second transfer layer (4) in which the receiving layer, the intermediate layer, and the heat seal layer are layered in this order on the release layer formed on one surface of the substrate, thereby forming a thermal transfer sheet 6 in which the first colorant layer (1), the second transfer layer (4), and the second colorant layer (1) are provided in this order on one surface, on the side of the easy-adhesive layer, of the substrate so as being frame sequentially, and the back face layer was provided on the side of the other surface of the substrate.

<Coating Liquid for Heat Seal Layer 3>

| | |
|---|---|
| Acryl type resin (Dianal(R) BR-87, Mitsubishi Rayon Co., Ltd.) | 3 parts |
| Polyvinyl chloride - vinyl acetate copolymer (SOLBIN(R) CNL, Nissin Chemical Co., Ltd.) | 1 parts |
| Titanium oxide | 16 parts |
| Methyl ethyl ketone | 40 parts |
| Toluene | 40 parts |

(Formation of Thermal Transfer Sheet A)

The same procedure as described for the thermal transfer sheet 1 was repeated, except that no second transfer layer (1) was formed to thereby form a thermal transfer sheet A in which the first colorant layer (1) and the second colorant layer (1) were provided in this order on one surface, on the side of the easy-adhesive layer, of the substrate so as being frame sequentially, and the back face layer was provided on the side of the other surface of the substrate.

(Formation of Thermal Transfer Sheet B)

The same procedure as described for the thermal transfer sheet 1 was repeated, except that the first colorant layer (1) was replaced by the first colorant layer (3) and no second transfer layer (1) was formed to thereby form a thermal transfer sheet B in which the first colorant layer (3) and the second colorant layer (1) were provided in this order on one surface, on the side of the easy-adhesive layer, of the substrate so as being frame sequentially, and the back face layer was provided on the side of the other surface of the substrate.

(Combination of Thermal Transfer Sheet and Intermediate Transfer Medium)

Combinations of a thermal transfer sheet and an intermediate transfer medium shown in Table 1 below were used as combinations of Examples and Comparative Examples.

(Formation of Print of Each Example)

Using thermal transfer sheets and intermediate transfer media of combinations for Examples shown in Table 1 below, and by means of the following printer, energy corresponding to the image pattern was applied to each of combinations of Examples 1, 5, and 6 to allow the colorant component contained in the first colorant layer of the thermal transfer sheet to migrate onto the first transfer layer of the intermediate transfer medium, or 55/255 gradation energy was applied to each of combinations of Examples 2 to 4 to transfer the first colorant layer of the thermal transfer sheet onto the first transfer layer of the intermediate transfer medium, thereby a first image was formed on the first transfer layer. Subsequently, the second transfer layer of the thermal transfer sheet was transferred onto the first image using the following printer under a 55/255 gradation printing condition. Then, by means of the following printer, energy corresponding to the image pattern was applied to each of combinations of Examples 1 to 3, 5, and 6 to allow the colorant component contained in the second colorant layer of the thermal transfer sheet to migrate onto the second transfer layer, or 55/255 gradation energy was applied to the combination of Example 4 to transfer the second colorant layer of the thermal transfer sheet onto the second transfer layer, thereby a second image was formed on the second transfer layer. Subsequently, using a card laminator (manufactured by SIP Corporation) and conditions of 180° C. and 2 inch/sec., the second transfer layer in which the second image was formed was transferred together with the first transfer layer on which the first image was formed onto on a polyvinyl chloride card (PVC card) (Dai Nippon Printing Co., Ltd.) as a transfer receiving article to thereby form a print of each of Examples. In the combination of Example 6, 55/255 gradation energy was applied thereto transfer the second transfer layer onto only the region where the image was formed of the first image and transfer the second colorant layer onto the first transfer layer (the region where the second transfer layer was not transferred), thereby a second image was formed.

(Formation of Print of Each Comparative Example)

Using thermal transfer sheets and intermediate transfer media of combinations for Comparative Examples shown in Table 1 below, and by means of the following printer, energy corresponding to the image pattern was applied to the combination of Comparative Example 1 to allow the colorant component contained in the first colorant layer of the thermal transfer sheet to migrate onto the first transfer layer of the intermediate transfer medium, or 55/255 gradation energy was applied to the combinations of Comparative Example 2 to transfer the first colorant layer of the thermal transfer sheet onto the first transfer layer of the intermediate transfer medium, thereby a first image was formed on the first transfer layer. Then, by means of the following printer, energy corresponding to the image pattern was applied to allow the colorant component contained in the second colorant layer of the thermal transfer sheet to migrate onto the first image, thereby a second image was formed. Subsequently, using a card laminator (manufactured by SIP Corporation) and conditions of 180° C. and 2 inch/sec., the first transfer layer on which the first image and the second image were formed was transferred onto on a polyvinyl chloride card (PVC card) (Dai Nippon Printing Co., Ltd.) as a transfer receiving article to thereby form a print of each Comparative Examples.

(Printer)
 Thermal head: KEE-57-12GAN2-STA (KYOCERA Corporation)
 Heater average resistance: 3303 ($\Omega$)
 Main scanning direction printing density: 300 (dpi)
 Sub scanning direction printing density: 300 (dpi)
 Line cycle: 3.0 (msec./line)
 Printing start temperature: 35 (° C.)
 Pulse duty ratio: 85(%)
 Printing voltage: 18.0 (V)

(Fluorescence Evaluation)

Light emission of the fluorescent dye when prints of Examples 1, 2, 4 to 6 and Comparative Example 1 were irradiated with black light was visually checked, and fluorescence evaluation was carried out based on the following evaluation criteria. The evaluation results are also shown in Table 1.

"Evaluation Criteria"
 A . . . With black light irradiation, fluorescent emission can be clearly observed.
 NG . . . Even with black light irradiation, substantially no fluorescent emission was observed.

(Depth Evaluation)

The prints of Examples and Comparative Examples were each visually checked if the prints each had depth feeling, specifically if stereoscopic feeling was imparted between the first image and the second image, and depth evaluation was carried out based on the following evaluation criteria. The evaluation results are also shown in Table 1.

"Evaluation Criteria"
 A . . . The print has depth feeling (stereoscopic feeling).
 NG . . . The print has no depth feeling (stereoscopic feeling).

TABLE 1

| | Thermal transfer sheet | | | | Intermediate transfer medium | Fluorescence evaluation | Depth evaluation |
|---|---|---|---|---|---|---|---|
| Example 1 | Thermal transfer sheet 1 | First colorant layer (1) | Second transfer layer (1) | Second colorant layer (1) | Intermediate transfer medium 1 | A | A |
| Example 2 | Thermal transfer sheet 2 | First colorant layer (2) | Second transfer layer (1) | Second colorant layer (1) | Intermediate transfer medium 1 | A | A |
| Example 3 | Thermal transfer sheet 3 | First colorant layer (3) | Second transfer layer (1) | Second colorant layer (1) | Intermediate transfer medium 1 | — | A |
| Example 4 | Thermal transfer sheet 4 | First colorant layer (2) | Second transfer layer (2) | Second colorant layer (2) | Intermediate transfer medium 1 | A | A |
| Example 5 | Thermal transfer sheet 5 | First colorant layer (1) | Second transfer layer (3) | Second colorant layer (1) | Intermediate transfer medium 1 | A | A |
| Example 6 | Thermal transfer sheet 6 | First colorant layer (1) | Second transfer layer (4) | Second colorant layer (1) | Intermediate transfer medium 1 | A | A |
| Comparative Example 1 | Thermal transfer sheet A | First colorant layer (1) | None | Second colorant layer (1) | Intermediate transfer medium 1 | NG | NG |
| Comparative Example 2 | Thermal transfer sheet B | First colorant layer (3) | None | Second colorant layer (1) | Intermediate transfer medium 1 | — | NG |

REFERENCE SIGNS LIST

10 Intermediate transfer medium
1 Support
5 First transfer layer
100 Thermal transfer sheet
50 Substrate
51 First colorant layer
52 Second colorant layer
53 Third colorant layer
54 Function layer, masking layer
55, 55', 55"Second transfer layer
55A Receiving layer
55B Heat-seal panel
20 First image
30 Second image
60 Transfer foil
200 Transfer receiving article
300 Print

The invention claimed is:

1. A method for forming a print, comprising;
providing an intermediate transfer medium in which a first transfer layer is provided on a support;
providing a thermal transfer sheet; and
providing a transfer receiving article;
wherein the thermal transfer sheet has a first colorant layer, a second colorant layer, and a second transfer layer,
wherein the thermal transfer sheet is any of
(i) a combination of a thermal transfer sheet in which the first colorant layer is provided on a substrate, a thermal transfer sheet in which the second colorant layer is provided on a substrate, and a thermal transfer sheet in which the second transfer layer is provided on a substrate,
(ii) a combination of a thermal transfer sheet in which any one layer of the first colorant layer, the second colorant layer, and the second transfer layer is provided on a substrate and a thermal transfer sheet in which the other two layers are provided on a substrate so as being frame sequentially, and
(iii) a thermal transfer sheet in which the first colorant layer, the second colorant layer, and the second transfer layer are provided on a substrate so as being frame sequentially, and
wherein the method further comprises
combining the intermediate transfer medium with the thermal transfer sheet, and forming a first image onto a portion of the first transfer layer of the intermediate transfer medium using the first colorant layer of the thermal transfer sheet,
transferring the second transfer layer of the thermal transfer sheet onto the first image so that at least a portion of a region on which the first image of the first transfer layer was not formed is exposed,
forming a second image on the exposed first transfer layer using the second colorant layer of the thermal transfer sheet, and
transferring the first transfer layer having the first image together with the second transfer layer having the second image onto the transfer receiving article.

* * * * *